United States Patent
Kim et al.

(10) Patent No.: US 8,986,063 B2
(45) Date of Patent: Mar. 24, 2015

(54) METHOD OF ALIGNING LIQUID CRYSTALS IN A PROCESS OF MANUFACTURING LIQUID CRYSTAL DISPLAY

(71) Applicant: Samsung Display Co., Ltd., Yongin, Gyeonggi-Do (KR)

(72) Inventors: Jang-Il Kim, Bucheon-si (KR); Sung Hee Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 30 days.

(21) Appl. No.: 13/827,352

(22) Filed: Mar. 14, 2013

(65) Prior Publication Data

US 2014/0120795 A1    May 1, 2014

(30) Foreign Application Priority Data

Oct. 30, 2012  (KR) .................. 10-2012-0121195

(51) Int. Cl.
| | | |
|---|---|---|
| *H01J 9/233* | (2006.01) | |
| *G02F 1/1333* | (2006.01) | |
| *G02F 1/1345* | (2006.01) | |
| *G02F 1/1337* | (2006.01) | |
| *G02F 1/1339* | (2006.01) | |
| *G02F 1/1334* | (2006.01) | |

(52) U.S. Cl.
CPC ........... *H01J 9/233* (2013.01); *G02F 1/133351* (2013.01); *G02F 1/1345* (2013.01); *G02F 1/133788* (2013.01); *G02F 1/13394* (2013.01); *G02F 2001/13345* (2013.01); *G02F 2001/133715* (2013.01)
USPC .............................................. 445/25; 445/24

(58) Field of Classification Search
USPC ................................ 445/24–25; 313/498–512
See application file for complete search history.

(56) References Cited

U.S. PATENT DOCUMENTS

| | | |
|---|---|---|
| 5,717,476 A | 2/1998 | Kanezawa |
| 2009/0270007 A1 | 10/2009 | Seok et al. |
| 2010/0045886 A1 | 2/2010 | Kwak |
| 2011/0141417 A1 | 6/2011 | Kim |
| 2011/0310342 A1 | 12/2011 | Kim et al. |
| 2013/0017750 A1 | 1/2013 | Wu et al. |

FOREIGN PATENT DOCUMENTS

| | | |
|---|---|---|
| CN | 102236200 | 11/2011 |
| JP | 2003-248208 A | 9/2003 |
| JP | 2010-266896 A | 11/2010 |
| KR | 1020090090817 A | 8/2009 |
| KR | 102010047570 A | 5/2010 |
| KR | 102010084823 A | 7/2010 |

OTHER PUBLICATIONS

European Search Report—European Application No. EP13158286 dated Jan. 27, 2014.

*Primary Examiner* — Tracie Y Green
(74) *Attorney, Agent, or Firm* — Cantor Colburn LLP

(57) ABSTRACT

A method of manufacturing a liquid crystal display includes: preparing a lower mother substrate, where lower cells, each including a thin film transistor, are provided on the lower mother substrate, and a lower alignment layer is disposed on the lower cells; preparing an upper mother substrate, where upper cells corresponding to the lower cells are provided on the upper mother substrate, and an upper alignment layer is disposed on the upper cells; providing a mother substrate assembly by providing a liquid crystal mixture layer between the lower and upper mother substrates and combining the lower and upper mother substrates; providing a pretilt of the liquid crystals by applying a voltage to a voltage application unit of the lower mother substrate; and curing an alignment supporting agents in the liquid crystal mixture layer or the lower and upper alignment layers by irradiating light to a side of the mother substrate assembly.

20 Claims, 31 Drawing Sheets

Irradiate light

METHOD OF ALIGNING LIQUID CRYSTALS IN A PROCESS OF MANUFACTURING LIQUID CRYSTAL DISPLAY

This application claims priority to Korean Patent Application No. 10-2012-0121195, filed on Oct. 30, 2012, and all the benefits accruing therefrom under 35 U.S.C. §119, the content of which in its entirety is herein incorporated by reference.

BACKGROUND (a) Field

Exemplary embodiments of the invention relate to a method of manufacturing a liquid crystal display, and more particularly, to a method of manufacturing a liquid crystal display with improved a response speed of liquid crystal.

(b) Description of the Related Art

A liquid crystal display is one of the currently most widely used flat panel displays, and includes two display panels on which electric field generating electrodes, such as a pixel electrode and a common electrode, are provided, and a liquid crystal layer interposed between the two display panels. The liquid crystal display generates an electric field in a liquid crystal layer by applying a voltage to the electric field generating electrode, determines a direction of liquid crystal molecules of the liquid crystal layer through the generated electric field, and controls polarization of incident light to display an image.

Among the liquid crystal displays, a liquid crystal display in a vertically aligned mode, in which longitudinal axes of the liquid crystal molecules are arranged substantially perpendicular to upper and lower display panels when the electric field is not generated therein, has been in the limelight because of a high contrast ratio and easy implementation of a wide reference viewing angle.

In the liquid crystal display in the vertically aligned mode, a plurality of domains having different alignment directions of the liquid crystals may be provided in one pixel to implement a wide viewing angle.

The domains may be provided by a method of forming incised portions, such as slits, in the electric field generating electrodes. In the method, the liquid crystals are re-arranged by a fringe field formed between an edge of the incised portion and the electric field generating electrode facing the edge of the incised portion to provide the plurality of domains.

The domains of a liquid crystal display may be provided as a liquid crystal display in a vertical alignment ("VA") mode, in which a domain forming unit is provided in both upper and lower substrates, or as a liquid crystal display in a patternless VA mode, in which a fine pattern is formed only on a lower substrate and a pattern is not formed on an upper substrate. A display area is divided into the domains by the domain forming unit, and the liquid crystals within the respective domains are tilted substantially in the same direction.

Recently, an initial alignment method, by which a liquid crystal has a pretilt angle when an electric field is not generated therein, has been suggested to increase a response speed of the liquid crystal while implementing a wide viewing angle. To provide the pretilt of the liquid crystal in multiple directions, the electric field is applied to the liquid crystal layer using an alignment layer having multiple alignment directions or adding an alignment supporting material to the liquid crystal to have a pretilt angle, and then the alignment supporting material is cured. The alignment supporting material cured by heat or light, such as ultraviolet ray, such that the liquid crystal may have the pretilt angle in a specific direction. When the electric field is generated in the liquid crystal layer to provide the pretilt angle, a voltage is applied to each of the electric field generating electrodes.

In a method of manufacturing the liquid crystal display, a plurality of cells is formed by providing multiple layered thin film patterns on a mother substrate through a deposition process and a photolithography process and cutting the mother substrate for each cell to manufacture the liquid crystal display. When a voltage is applied to the electric field generating electrodes in a process of aligning the liquid crystals, if the voltage is applied for each cut cell and ultraviolet ray is irradiated, a lot of time and equipment may be used, such that productivity is degraded.

Further, when the irradiated light does not sufficiently reach the liquid crystal layer when light, such as ultraviolet rays, is irradiated during the process of aligning the liquid crystals, the liquid crystals may not have a target pretilt angle, such that a response speed of the liquid crystal may be decreased and uniformity of an operation of the liquid crystal may be degraded when the manufactured liquid crystal display is driven.

SUMMARY

In exemplary embodiments, a response speed of a manufactured liquid crystal display is substantially improved by enabling light, such as ultraviolet rays, to sufficiently reach a liquid crystal layer and sufficiently achieving initial alignment of liquid crystals during a step of aligning the liquid crystals in a process of manufacturing the liquid crystal display.

In exemplary embodiments, a method of aligning liquid crystals is facilitated in a process of manufacturing a liquid crystal display.

An exemplary embodiment of the invention provides a method of manufacturing a liquid crystal display, the method including: preparing a lower mother substrate, where a plurality of lower cells including a thin film transistor is provided on the lower mother substrate, and a lower alignment layer is disposed on the plurality of lower cells; preparing an upper mother substrate, where a plurality of upper cells corresponding to the plurality of lower cells, respectively, is provided on the upper mother substrate, and an upper alignment layer is disposed on the plurality of upper cells; providing a mother substrate assembly by providing a liquid crystal mixture layer including liquid crystals between the lower mother substrate and the upper mother substrate and combining the lower mother substrate and the upper mother substrate; providing a pretilt of the liquid crystals by applying a voltage to a voltage application unit of the lower mother substrate, which is exposed by the upper mother substrate; and curing an alignment supporting agents contained in at least one of the liquid crystal mixture layer and the lower and upper alignment layers by irradiating light to the mother substrate assembly from a side of the lower mother substrate.

In an exemplary embodiment, each of the plurality of upper cell may include a color filter.

In an exemplary embodiment, the voltage application unit may include a lower panel voltage application wiring and an upper panel voltage application wiring, which are positioned between adjacent lower cells and extending along a column of the plurality of lower cells.

In an exemplary embodiment, the method may further include providing a lower panel voltage application pad, which is connected to a signal line of the lower cell, on the lower mother substrate.

In an exemplary embodiment, the method may further include providing a lower panel connecting bridge and an upper panel connecting bridge on the upper mother substrate, where the lower panel connecting bridge overlaps the lower panel voltage application wiring and the lower panel voltage application pad, and the upper panel connecting bridge overlaps the upper panel voltage application wiring and connected to an opposing electrode positioned in an upper cell corresponding to the lower cell.

In an exemplary embodiment, the method may further include providing a first short spacer, a second short spacer and a third short spacer between the lower mother substrate and the upper mother substrate, where the first short spacer is configured to electrically connect the lower panel voltage application pad and the lower panel connecting bridge, the second short spacer is configured to electrically connect the lower panel voltage application wiring and the lower panel connecting bridge, and the third short spacer is configured to electrically connect the upper panel voltage application wiring and the upper panel connecting bridge.

In an exemplary embodiment, the method may further include providing a guard ring in a same layer as at least one of the lower panel voltage application wiring, the lower panel voltage application pad and the upper panel voltage application wiring, where the guard ring may be disposed between the lower panel voltage application wiring and the upper panel voltage application wiring, and the lower panel voltage application pad.

In an exemplary embodiment, the voltage application unit may include a first lower panel voltage application wiring, a second lower panel voltage application wiring, and an upper panel voltage application wiring, and the first lower panel voltage application wiring, the second lower panel voltage application wiring and the upper panel voltage application wiring are disposed between adjacent lower cells and extending along a column of the plurality of lower cells.

In an exemplary embodiment, the method may further include providing a first lower panel voltage application pad and a second lower panel voltage application pad on the lower mother substrate, where the first lower panel voltage application pad is connected to a gate line for transmitting a gate signal to the thin film transistor of a lower cell of the plurality of lower cells, and the second lower panel voltage application pad is connected to a data line which transmits a data voltage to the thin film transistor of the lower cell.

In an exemplary embodiment, the method may further include providing a first lower panel connecting bridge, a second lower panel connecting bridge and an upper panel connecting bridge on the upper mother substrate, where the first lower panel connecting bridge overlaps the first lower panel voltage application wiring and the first lower panel voltage application pad, the second lower panel connecting bridge overlaps the second lower panel voltage application wiring and the second lower panel voltage application pad, and the upper panel connecting bridge overlaps the upper panel voltage application wiring and is connected to an opposing electrode disposed in an upper cell corresponding to the lower cell.

In an exemplary embodiment, the method may further include providing a first short spacer, a second short spacer, a third short spacer, a fourth short spacer and a fifth short spacer between the lower mother substrate and the upper mother substrate, where the first short spacer is configured to electrically connect the first lower panel voltage application pad and the first lower panel connecting bridge, the second short spacer is configured to electrically connect the first lower panel voltage application wiring and the first lower panel connecting bridge, the third short spacer is configured to electrically connect the second lower panel voltage application pad and the second lower panel connecting bridge, the fourth short spacer is configured to electrically connect the second lower panel voltage application wiring and the second lower panel connecting bridge, and the fifth short spacer is configured to electrically connect the upper panel voltage application wiring and the upper panel connecting bridge.

In an exemplary embodiment, the method may further include providing a guard ring in a same layer as at least one of the first and second lower panel voltage application wirings, the lower panel voltage application pad and the upper panel voltage application wiring, where the guard ring may be disposed between the upper panel voltage application wiring and the lower panel voltage application pad.

In an exemplary embodiment, the voltage application unit may include a lower panel voltage application electrode and an upper panel voltage application electrode, which are positioned adjacently to an edge of the lower mother substrate.

In an exemplary embodiment, the method may further include providing a lower panel voltage application pad on the lower mother substrate, where the lower panel voltage application pad is connected to a signal line of the lower cell.

In an exemplary embodiment, the method may further include providing an opposing electrode and a voltage transmission electrode on the upper mother substrate, where the opposing electrode is disposed in the upper cell and overlaps the upper panel voltage application electrode, and the voltage transmission electrode is insulated from the opposing electrode and overlaps the lower panel voltage application electrode.

In an exemplary embodiment, the method may further include providing a first short spacer, a second short spacer and a third short spacer between the lower mother substrate and the upper mother substrate, where the first short spacer is configured to electrically connect the lower panel voltage application pad and the voltage transmission electrode, the second short spacer is configured to electrically connect the lower panel voltage application electrode and the voltage transmission electrode, and the third short spacer is configured to electrically connect the upper panel voltage application electrode and the opposing electrode.

According to exemplary embodiments of the invention, light, such as ultraviolet rays, effectively reaches the liquid crystal layer and the initial alignment of the liquid crystals is effectively achieved in a process of aligning the liquid crystal during the process of manufacturing the liquid crystal display, thereby substantially improving a response speed of the liquid crystal display. In such embodiments, the method of aligning the liquid crystals in the process of manufacturing the liquid crystal display is substantially facilitated.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
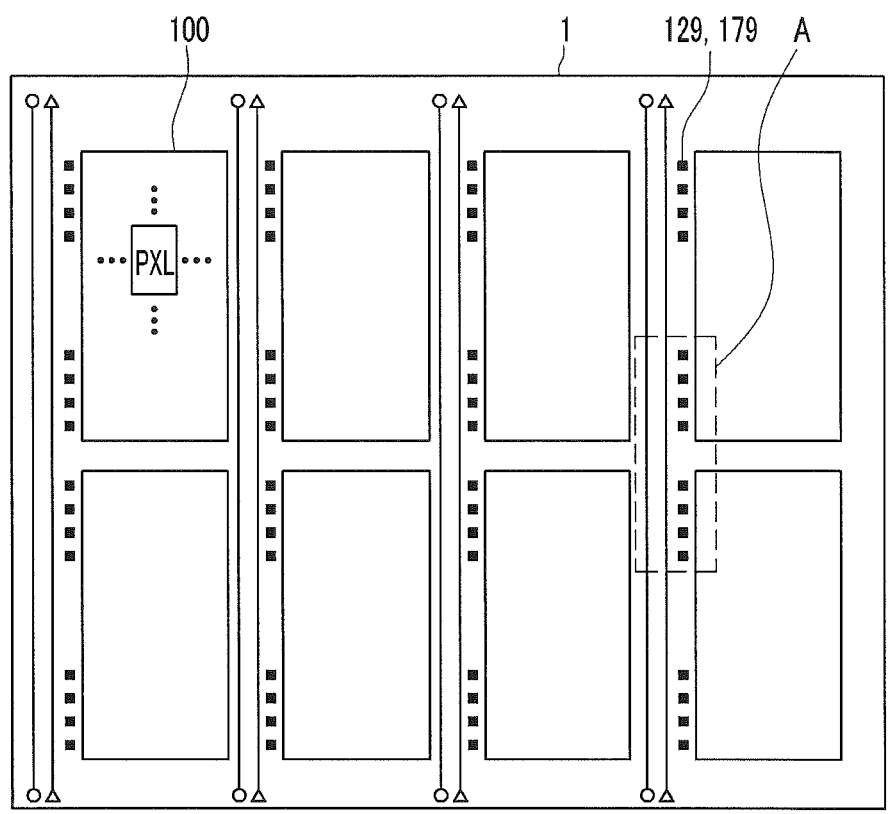
FIG. 1 is a block diagram showing a lower mother substrate in a process of an exemplary embodiment of a method of manufacturing a liquid crystal display according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice.

Exemplary embodiments of a method of manufacturing a liquid crystal display according to the invention will be described in detail with reference to the accompanying drawings.

First, an exemplary embodiment of the method of manufacturing the liquid crystal display according to the invention will be described with reference to FIGS. 1 to 15.

Figure 2:
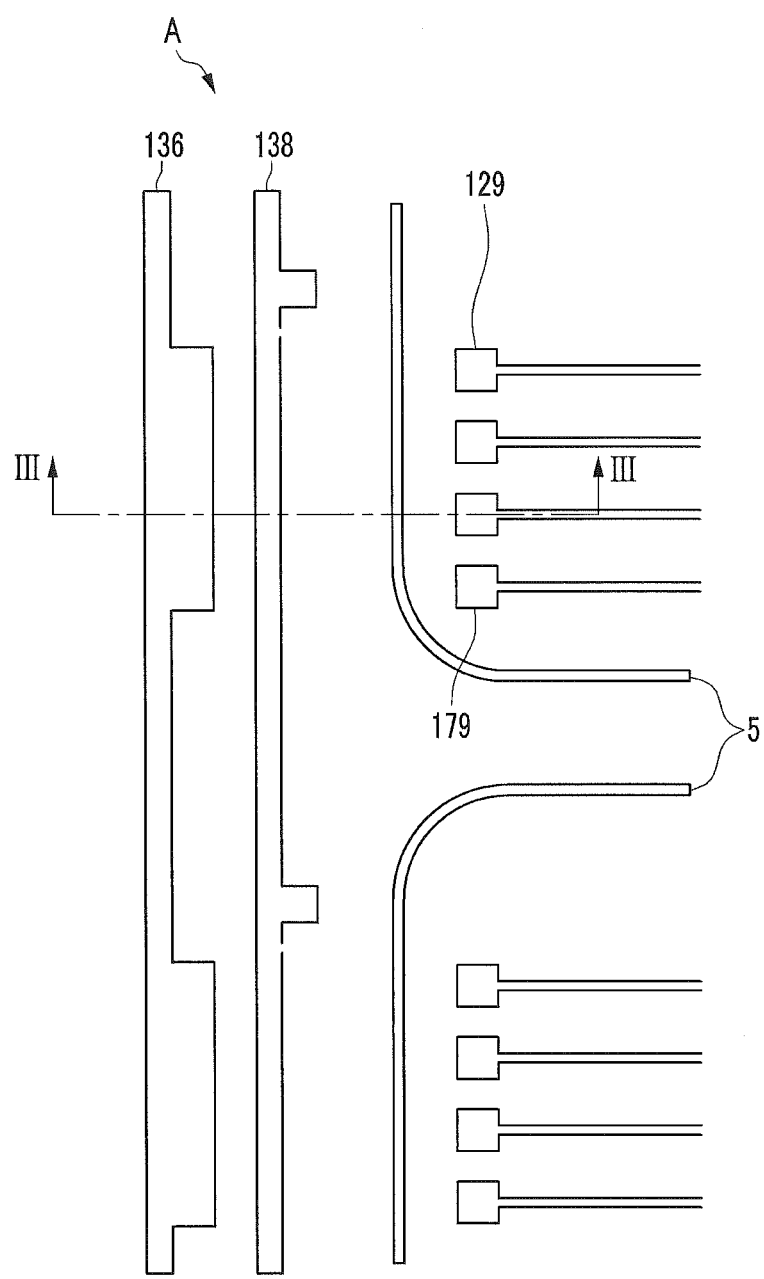
FIG. 2 is an enlarged top plan view of portion A of FIG. 1.
Figure 3:
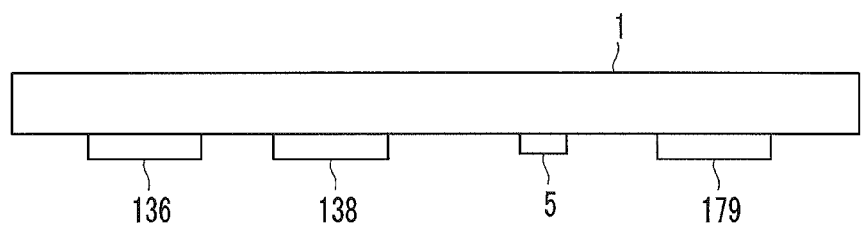
FIG. 3 is a cross-sectional view taken along line III-III of the lower mother substrate of FIG. 2.
Figure 4:
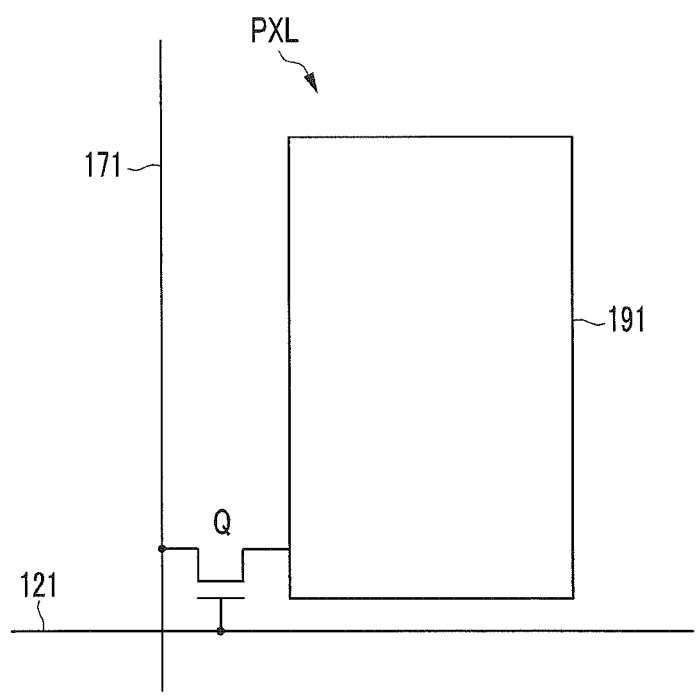
FIG. 4 is a block diagram showing a pixel of the lower mother substrate in a process of an exemplary embodiment of the method of manufacturing the liquid crystal display according to the invention.
Figure 5:
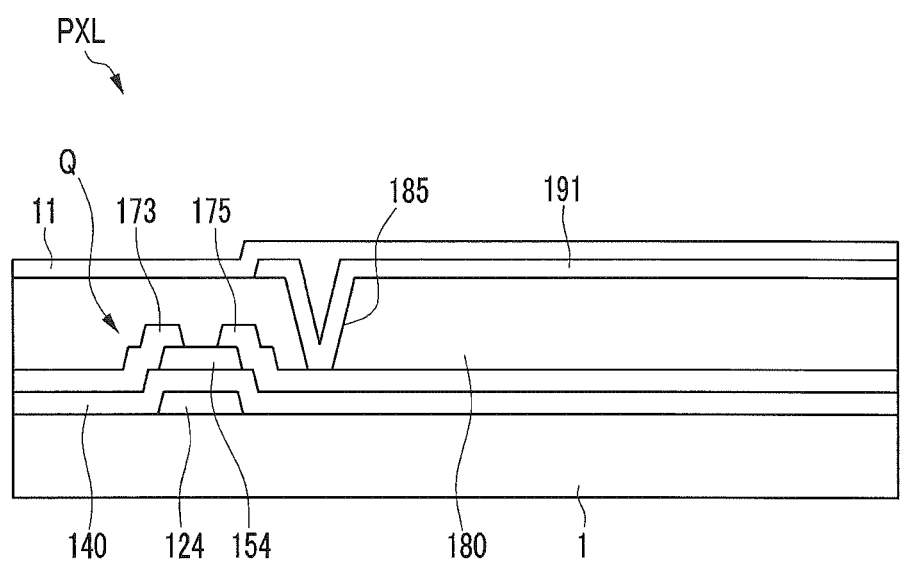
FIG. 5 is a cross-sectional view of a pixel of the lower mother substrate in a process of an exemplary embodiment of the method of manufacturing the liquid crystal display according to the invention.
Figure 6:
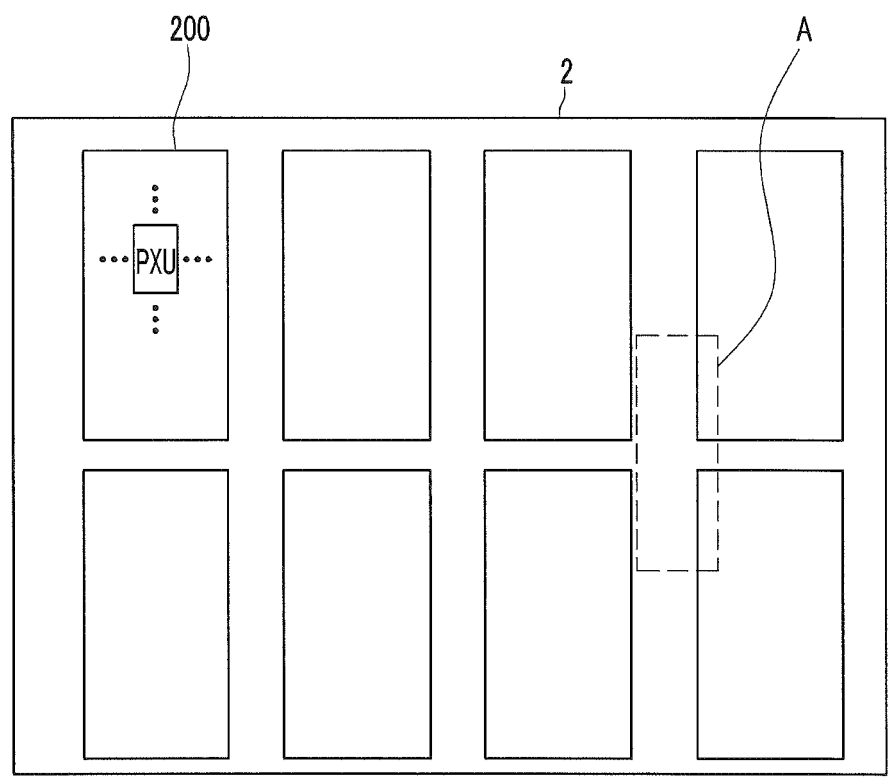
FIG. 6 is a block diagram showing an upper mother substrate in a process of an exemplary embodiment of the method of manufacturing the liquid crystal display according to the invention.
Figure 7:
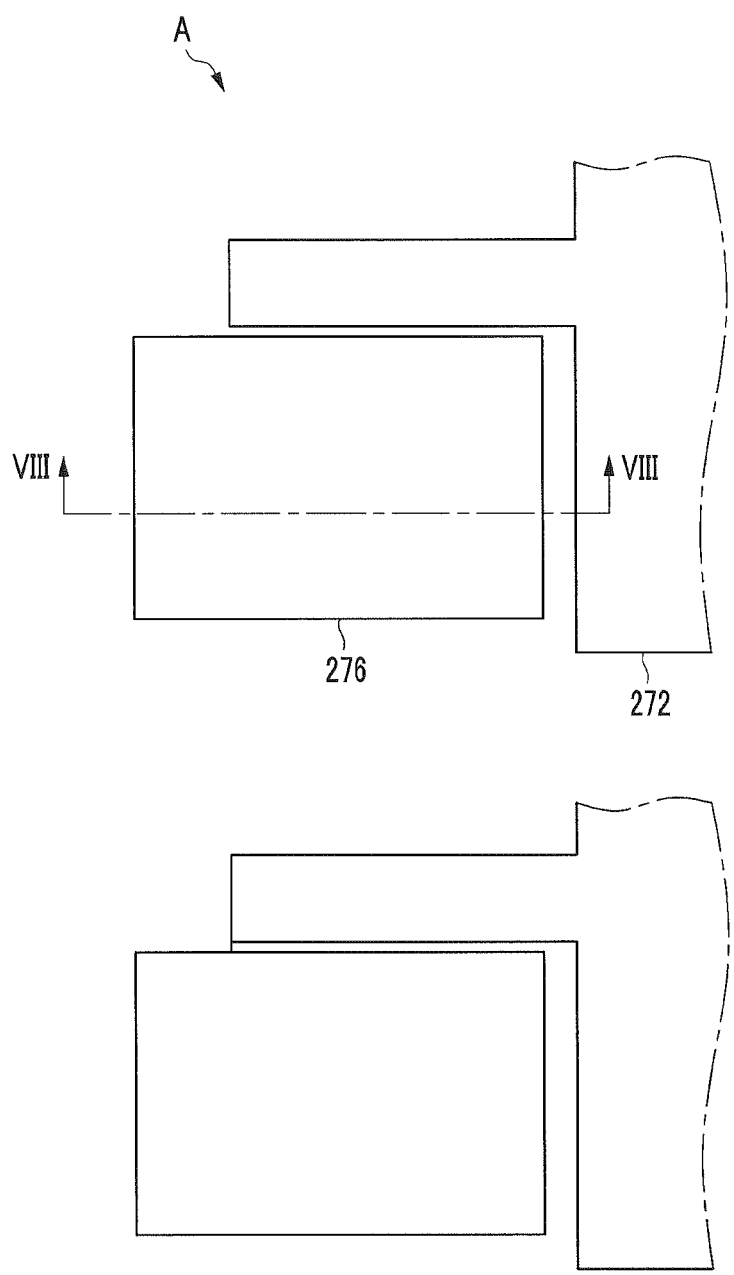
FIG. 7 is an enlarged top plan view of portion A of FIG. 6.
Figure 8:
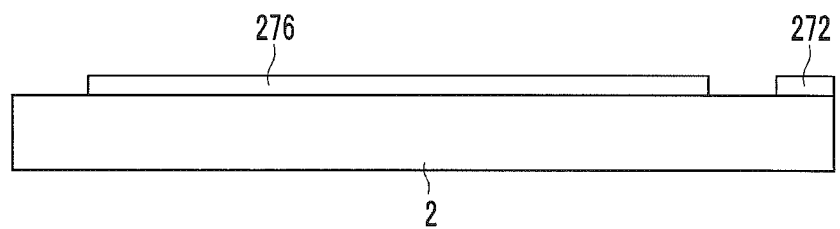
FIG. 8 is a cross-sectional view taken along line VIII-VIII of the upper mother substrate of FIG. 7.
Figure 9:
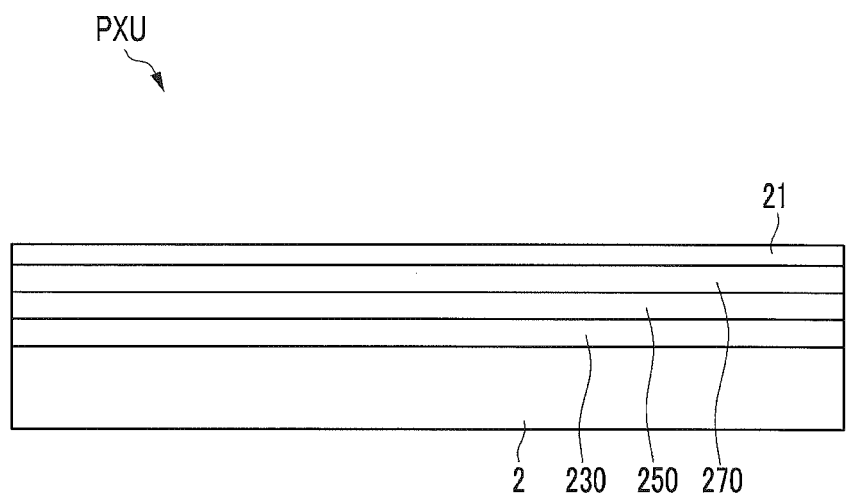
FIG. 9 is a cross-sectional view of a pixel of the upper mother substrate in a process of an exemplary embodiment of the method of manufacturing the liquid crystal display according to the invention.
Figure 10:
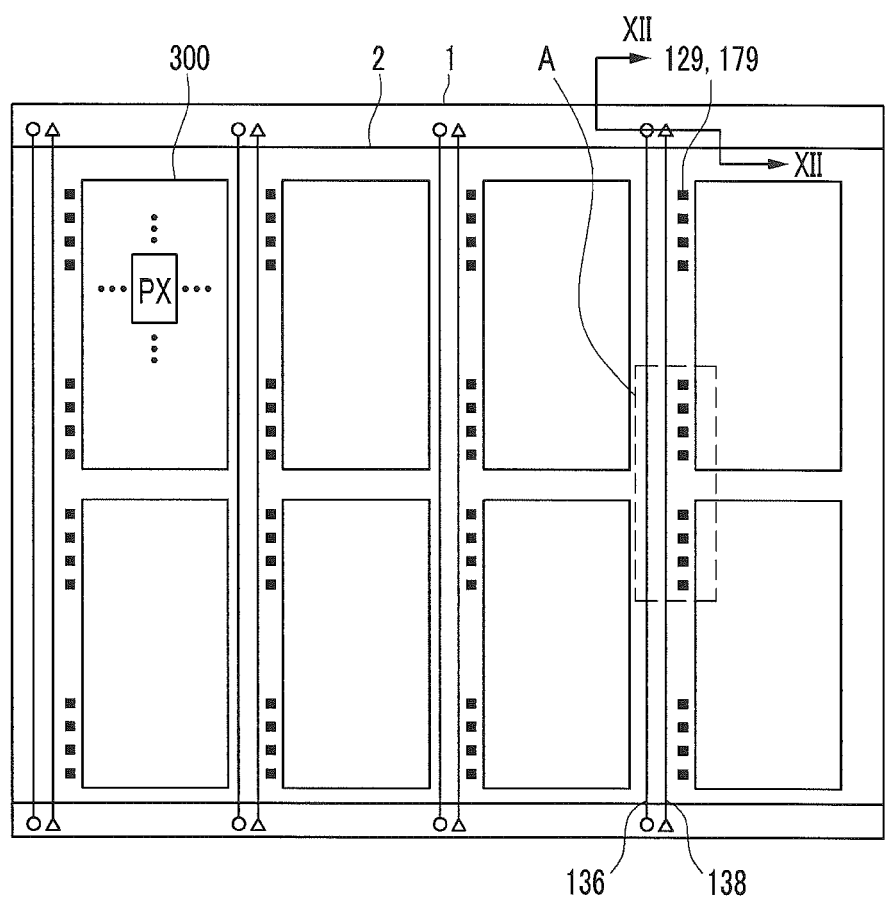
FIG. 10 is a block diagram showing the lower mother substrate and upper mother substrate bonded together in a process of an exemplary embodiment of the method of manufacturing the liquid crystal display according to the invention.
Figure 11:
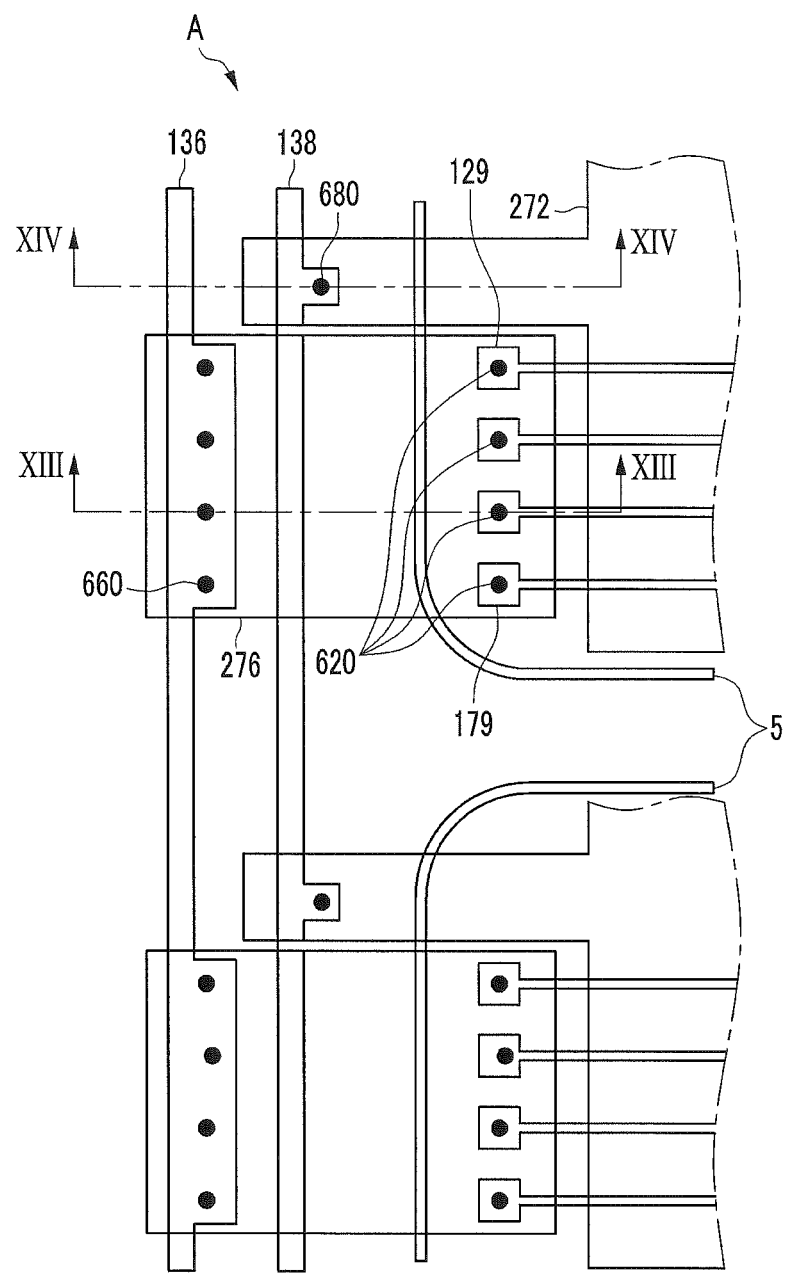
FIG. 11 is an enlarged top plan view of portion A of FIG. 10.
Figure 12:
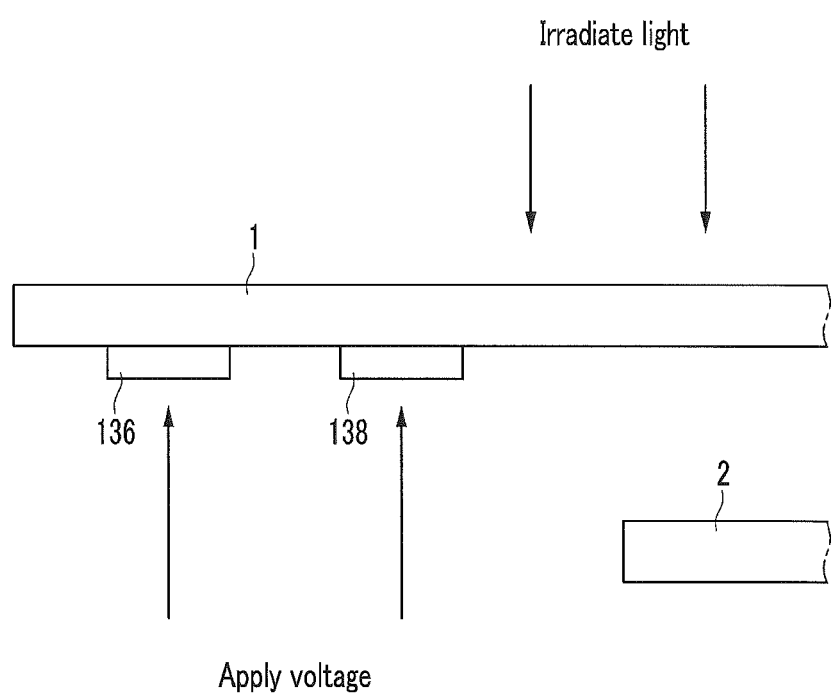
FIG. 12 is a cross-sectional view taken along line XII-XII of the lower mother substrate and the upper mother substrate of FIG. 10 in a step of aligning liquid crystals of the liquid crystal display according to the exemplary embodiment of the invention.
Figure 13:
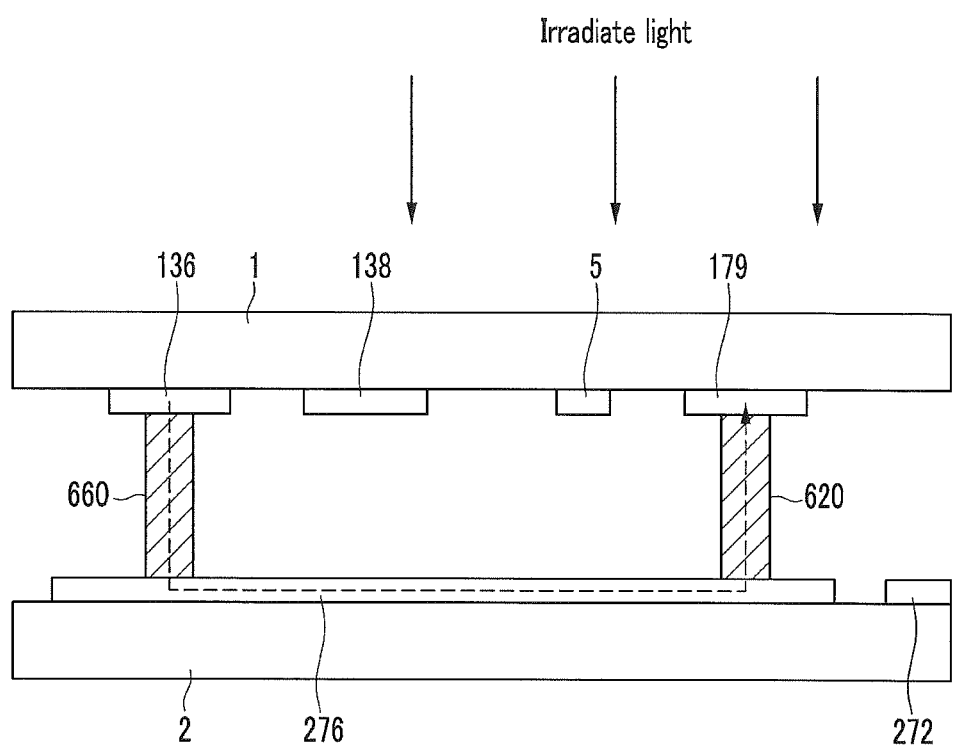
FIG. 13 is a cross-sectional view taken along line XIII-XIII of the lower mother substrate and the upper mother substrate of FIG. 11.
Figure 14:
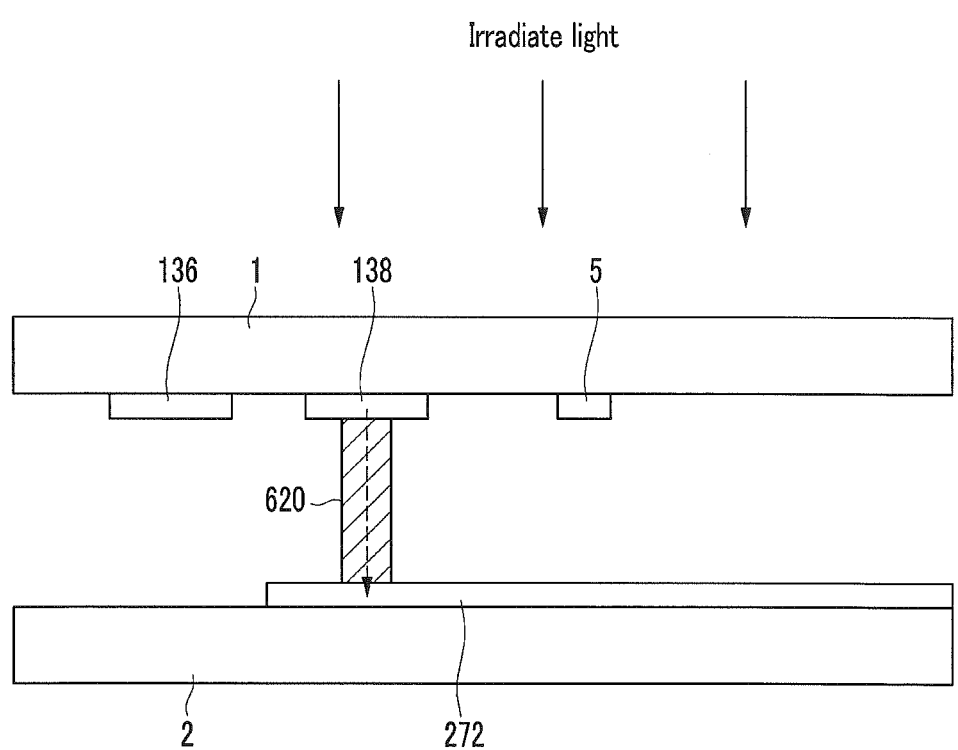
FIG. 14 is a cross-sectional view of the lower mother substrate and the upper mother substrate taken along line XIV-XIV of FIG. 11.
Figure 15A:
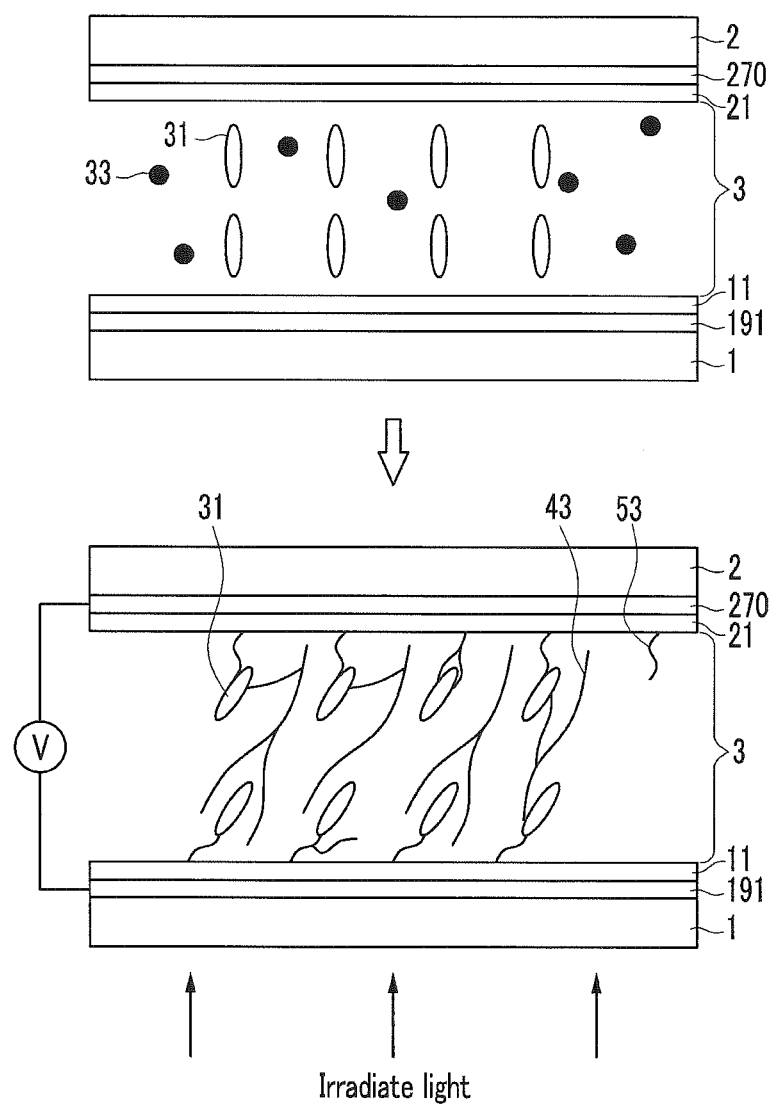
FIGS. 15A and 15B are cross-sectional views illustrating a process of aligning crystal liquids in an exemplary embodiment of the method of manufacturing the liquid crystal display according to the invention.
Figure 15B:
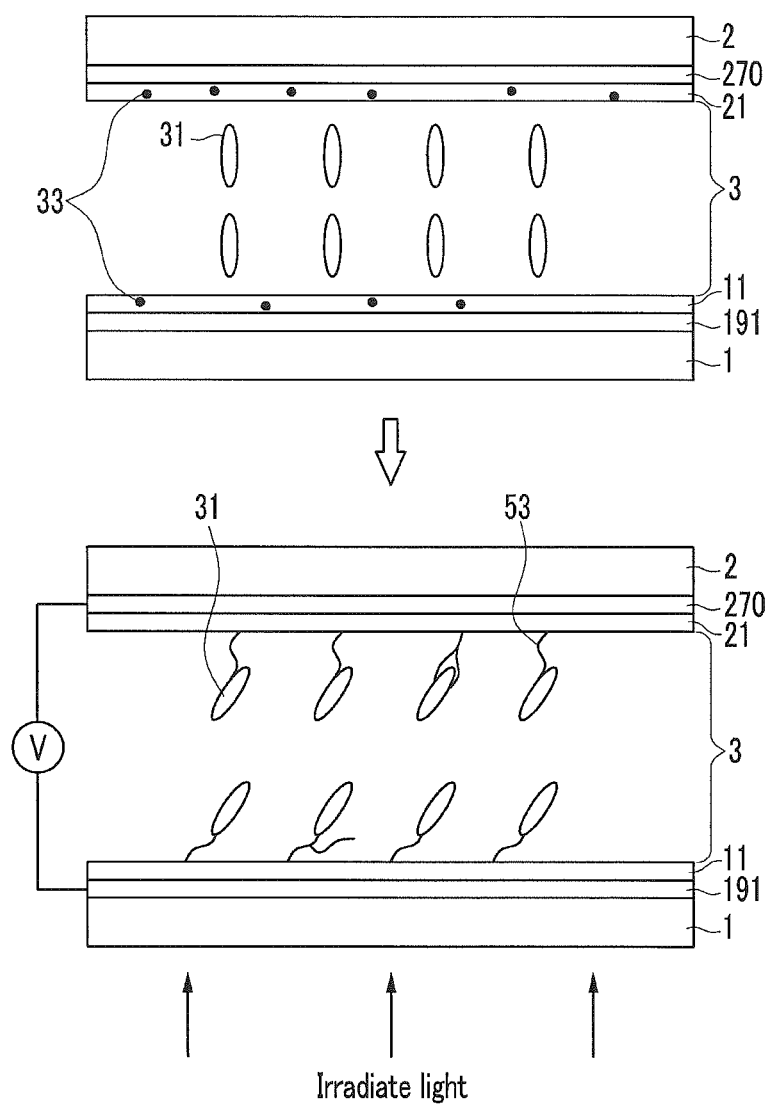

FIG. 1 is a block diagram showing a lower mother substrate in a process of an exemplary embodiment of a method of manufacturing a liquid crystal display according to the invention, FIG. 2 is an enlarged plan view of portion A of FIG. 1, FIG. 3 is a cross-sectional view taken along line III-III of the lower mother substrate of FIG. 2, FIG. 4 is a block diagram showing a pixel of the lower mother substrate in a process of an exemplary embodiment of the method of manufacturing the liquid crystal display according to the invention, FIG. 5 is a cross-sectional view of a pixel of the lower mother substrate in a process of an exemplary embodiment of the method of manufacturing the liquid crystal display according to the invention, FIG. 6 is a block diagram showing an upper mother substrate in a process of an exemplary embodiment of the method of manufacturing the liquid crystal display according to the invention, FIG. 7 is an enlarged top plan view of portion A of FIG. 6, FIG. 8 is a cross-sectional view taken along line VIII-VIII of the upper mother substrate of FIG. 7, FIG. 9 is a cross-sectional view of a pixel of the upper mother substrate in a process of an exemplary embodiment of the method of manufacturing the liquid crystal display according to the invention, FIG. 10 is a block diagram showing the bonded lower mother substrate and upper mother substrate bonded together in a process of an exemplary embodiment of the method of manufacturing the liquid crystal display according to the invention, FIG. 11 is an enlarged top plan view of portion A of FIG. 10, FIG. 12 is a cross-sectional view taken along line XII-XII of the lower mother substrate and the upper mother substrate of FIG. 10, FIG. 13 is a cross-sectional view taken along line XIII-XIII of the lower mother substrate and the upper mother substrate of FIG. 11, FIG. 14 is a cross-sectional view of the lower mother substrate and the upper mother substrate taken along line XIV-XIV of FIG. 11, and FIGS. 15A and 15B are cross-sectional views illustrating a process of aligning crystal liquids in an exemplary embodiment of the method of manufacturing the liquid crystal display according to the invention.

First, referring to FIGS. 1 to 5, in an exemplary embodiment of a method of manufacturing a liquid crystal display, a lower mother substrate 1 including a plurality of lower cells 100 arranged substantially in a matrix form is prepared.

Each lower cell 100 includes a plurality of signal lines and a plurality of pixel areas PXL connected to the plurality of signal lines and arranged substantially in a matrix form, in terms of an equivalent circuit.

The plurality of signal lines may include a plurality of gate lines for transmitting gate signals (also referred to as "scan signals") and a plurality of data lines for transmitting data voltages.

Referring to FIG. 4, in a process of an exemplary embodiment of the method of manufacturing the liquid crystal display according to the invention, a pixel area PXL included in the lower mother substrate 1 may include a switching element Q connected to a data line 171 and a gate line 121, and a pixel electrode 191 connected to the switching element Q. The switching element Q may include a thin film transistor, and operates based on a gate signal transmitted by the gate line 121 to transmit a data voltage transmitted by the data line 171 to the pixel electrode 191.

A stacked structure of an exemplary embodiment of a pixel area PXL will be described with reference to FIG. 5 as well as FIG. 4.

A gate conductor, such as the gate line 121 including a gate electrode 124, is disposed on the lower mother substrate 1. A gate insulating layer 140 is disposed on the gate conductor, and a semiconductor 154 including amorphous or crystalline silicon or an oxide semiconductor material may be disposed on the gate insulating layer 140.

In an exemplary embodiment, an ohmic contact member (not illustrated) may be disposed on the semiconductor 154. In an alternative exemplary embodiment, the ohmic contact member may be omitted.

The data line 171 including a source electrode 173 and a data conductor including a drain electrode 175 may be disposed on the semiconductor 154.

The gate conductor and the data conductor may include a conductive material, such as aluminum-based metal, such as aluminum (Al) and an aluminum alloy, silver-based metal, such as silver (Ag) and a silver alloy, copper-based metal, such as copper (Cu) and a copper alloy, molybdenum-based metal, such as molybdenum (Mo) and a molybdenum alloy, and metal, such as chromium (Cr), tantalum (Ta), and titanium (Ti), for example.

The gate electrode 124, the source electrode 173, the drain electrode 175 and the semiconductor 154 collectively define a thin film transistor Q, and a channel of the thin film transistor is provided in the semiconductor 154 between the source electrode 173 and the drain electrode 175.

A passivation layer 180 including an inorganic insulating material or an organic insulating material is disposed on the data conductor. The passivation layer 180 may include a contact hole 185, through which the drain electrode 175 is exposed.

The pixel electrode 191 may be disposed on the passivation layer 180. The pixel electrode 191 may receive a data voltage from the drain electrode 175 through the contact hole 185.

A lower alignment layer 11 is disposed on the pixel electrode 191. The lower alignment layer 11 may be a vertical alignment layer or a horizontal alignment layer. The lower alignment layer 11 may include alignment supporting agents for initially aligning liquid crystals. The alignment supporting agents may be a reactive monomer. In one exemplary embodiment, the alignment supporting agents may include, for example, an ultraviolet ray curable monomer. The lower alignment layer 11 may further include an initiator for curing ultraviolet ray. The ultraviolet ray curable monomer may be, for example, an acrylate-based monomer, and the initiator for curing ultraviolet ray may include a material absorbable in an ultraviolet ray area, for example, 2,2-dimethoxy-1,2-diphenyl ethanone.

The plurality of lower cells 100 of the lower mother substrate 1 is separated from each other in a subsequent process to form a lower display panel of the liquid crystal display. Hereinafter, the lower display panel and the lower cell will be denoted as a same reference numeral.

Referring to FIGS. 1, 2 and 3, a plurality of lower panel voltage application wirings 136 and a plurality of upper panel voltage application wirings 138, and at least one first lower panel voltage application pad 129 and at least one second lower panel voltage application pad 179 are provided on the lower mother substrate 1.

The plurality of lower panel voltage application wirings 136 and the plurality of upper panel voltage application wirings 138 may be disposed between the adjacent lower cells 100 and extend in a vertical direction along a column of the lower cells 100. In an exemplary embodiment of the invention, the plurality of lower panel voltage application wirings 136 and the plurality of upper panel voltage application wirings 138 are wirings for applying a voltage to the lower cell 100 disposed at a right side thereof, for example.

Each of the plurality of lower panel voltage application wirings 136 and the plurality of upper panel voltage application wirings 138 may include a plurality of expanded portions for connection with another layer.

Both ends of each of the plurality of lower panel voltage application wirings 136 and the plurality of upper panel voltage application wirings 138 are disposed near opposing edge sides of the lower mother substrate 1, respectively, and may receive a voltage from outside, e.g., from voltage application units. In FIG. 1, an end portion of the lower panel voltage application wiring 136 is illustrated by a circle, and an end portion of the upper panel voltage application wiring 138 is illustrated by a triangle.

In an exemplary embodiment, each of the plurality of lower panel voltage application wirings 136 and the plurality of upper panel voltage application wirings 138 may receive voltages from the both end portions of the lower mother substrate 1 as illustrated in FIG. 1. In an alternative exemplary embodiment, each of the plurality of lower panel voltage application wirings 136 and the plurality of upper panel voltage application wirings 138 may receive a voltage from only one end portion thereof.

The plurality of lower panel voltage application wirings 136 and the plurality of upper panel voltage application wirings 138 may include substantially the same material as the plurality of signal lines, such as the gate line 121 and the data line 171, of the lower cell 100, and may be provided together with the plurality of signal lines during a same process. In an alternative exemplary embodiment, the plurality of lower panel voltage application wirings 136 and the plurality of upper panel voltage application wirings 138 may be provided during a process different from a process of providing the plurality of signal lines.

The first lower panel voltage application pad 129 and the second lower panel voltage application pad 179 is disposed between the plurality of lower panel voltage application wirings 136 and the plurality of upper panel voltage application wirings 138, and the lower cells 100.

The first lower panel voltage application pad 129 and the second lower panel voltage application pad 179 may be arranged in a row direction along an edge side of the adjacent lower cells 100 extending substantially in a column direction. In such an embodiment, the first lower panel voltage application pad 129 and the second lower panel voltage application pad 179 may be arranged substantially parallel to the plurality of lower panel voltage application wirings 136 and the plurality of upper panel voltage application wirings 138.

The first lower panel voltage application pad 129 and the second lower panel voltage application pad 179 are connected to the plurality of signal lines of the lower cell 100. In an exemplary embodiment, the first lower panel voltage application pad 129 may be connected to the gate line 121 of the lower cell 100, and the second lower panel voltage application pad 179 may be connected to the data line 171 of the lower cell 100.

The first lower panel voltage application pad 129 and the second lower panel voltage application pad 179 may include the same material as the plurality of signal lines, such as the gate line 121 or the data line 171, of the lower cell 100. In an exemplary embodiment, the first lower panel voltage application pad 129 and the second lower panel voltage application pad 179 may be provided together with the plurality of signal lines in the same process. In an alternative exemplary embodiment, the first lower panel voltage application pad 129 and the second lower panel voltage application pad 179 is provided during a process different from a process for providing the plurality of signal lines. In an exemplary embodiment, the first lower panel voltage application pad 129 and the second lower panel voltage application pad 179 may be provided in a same layer as the plurality of signal lines, but not being limited thereto. In an alternative exemplary embodiment, the first lower panel voltage application pad 129 and the second lower panel voltage application pad 179 may be provided on a different layer from the plurality of signal lines, such as the gate line 121 or the data line 171.

The first lower panel voltage application pad 129 and the second lower panel voltage application pad 179 may be disposed inside the lower cell 100.

In an exemplary embodiment, a guard ring 5 that effectively prevents static electricity from flowing in the lower cell 100 during the process of manufacturing the liquid crystal display may be further provided between the plurality of lower and upper panel voltage application wirings 136 and 138, and the first and second lower panel voltage application pads 129 and 179. The guard ring 5 may include the same material as at least one of the plurality of lower panel voltage application wirings 136 and the plurality of upper panel voltage application wirings 138, and the first lower panel voltage application pad 129 and the second lower panel voltage application pad 179, and may be provided on the same layer in the same process as the plurality of lower panel voltage application wirings 136 and the plurality of upper panel voltage application wirings 138, and the first lower panel voltage application pad 129 and the second lower panel voltage application pad 179. In an alternative exemplary embodiment, the guard ring 5 may be provided on a different layer in a different process from the plurality of lower panel voltage application wirings 136 and the plurality of upper panel voltage application wirings 138, and the first lower panel voltage application pad 129 and the second lower panel voltage application pad 179.

Next, referring to FIGS. 6 to 9, an upper mother substrate 2, on which a plurality of upper cells 200 corresponding to the lower cells 100 of the lower mother substrate 1 and arranged substantially in a matrix form, is prepared. A size of the upper mother substrate 2 may be smaller than a size of the lower mother substrate 1.

The plurality of upper cells 200 includes a plurality of pixel areas PXU corresponding to the pixel area PXL of a corresponding lower cell 100. A pixel area PXL of a lower cell 100 and a pixel area PXU of an upper cell 200, which are corresponding to each other, collectively define a pixel PX (shown in FIG. 10), which is a unit for displaying an image.

Referring to FIG. 9, a pixel area PXU included in the upper mother substrate 2 in a process of an exemplary embodiment of the method of manufacturing the liquid crystal display according to the exemplary embodiment of the invention may include a color filter 230 disposed on the upper mother substrate 2, an overcoat layer 250 disposed on the color filter 230, and an opposing electrode 270 disposed on the overcoat layer 250. The opposing electrode 270 may include a transparent conductive material, such as indium tin oxide ("ITO") and indium zinc oxide ("IZO"). In an exemplary embodiment, a single opposing electrode 270 may be provided on an entire surface of an upper cell 200, and further the opposing electrodes 270 of the upper mother substrate 2 may be connected to each other and integrally formed as a single unitary and indivisible unit.

An upper alignment layer 21 is disposed on the opposing electrode 270. The upper alignment layer 21 may be a vertical alignment layer or a horizontal alignment layer. The upper alignment layer 21 may include alignment supporting agents for initially aligning liquid crystals. The alignment supporting agents may be a reactive monomer, and may include, for example, an ultraviolet ray curable monomer. The upper alignment layer 21 may further include an initiator for curing ultraviolet ray. The ultraviolet ray curable monomer may be, for example, an acrylate-based monomer, and the initiator for curing ultraviolet ray may include a material absorbable in an ultraviolet ray region and may include, for example, 2,2-dimethoxy-1,2-diphenyl ethanone.

A light blocking member (not illustrated) may be further disposed on the upper mother substrate 2. In an alternative exemplary embodiment, the light blocking member may be disposed on the lower mother substrate 1.

The plurality of upper cells 200 of the upper mother substrate 2 is separated from each other in a subsequent process to form an upper display panel of the liquid crystal display. Hereinafter, the upper display panel and the upper cell will be denoted as the same reference numeral.

Referring to FIGS. 6, 7 and 8, a plurality of upper panel connecting bridges 272 and a plurality of lower panel connecting bridges 276 are provided on the upper mother substrate 2.

An upper panel connecting bridge 272 may be connected to an opposing electrode 270 of the corresponding upper cell 200, and may include the same material as the opposing electrode 270, and may be provided together with the opposing electrode 270 in the same process. The upper panel connecting bridge 272 overlaps a portion of the upper panel voltage application wiring 138 of the lower mother substrate 1. The upper panel connecting bridge 272 may overlap the expanded portion of the corresponding upper panel voltage application wiring 138 of the lower mother substrate 1.

The lower panel connecting bridge 276 is shaped in the form of an island electrically and physically separated from the upper panel connecting bridge 272 and the opposing electrode 270. The lower panel connecting bridge 276 may include the same material as the upper panel connecting bridge 272 or the opposing electrode 270, and may be provided together with the upper panel connecting bridge 272 or the opposing electrode 270 in the same process. The lower panel connecting bridge 276 overlaps a part of the lower panel voltage application wiring 136, and the first lower panel voltage application pad 129 and the second lower panel voltage application pad 179 of the lower mother substrate 1. The lower panel connecting bridge 276 may overlap the expanded portion of the corresponding lower panel voltage application wiring 136 of the lower mother substrate 1.

The upper panel connecting bridge 272 and the lower panel connecting bridge 276 may include a transparent conductive material, such as ITO and IZO.

Next, referring to FIGS. 10 to 14, a plurality of short spacers, e.g., a plurality of first short spacers 620, a second short spacer 660 and a third short spacer 680, is provided on the lower mother substrate 1 or the upper mother substrate 2. The plurality of short spacers 620, 660 and 680 may be conductive pillar-shaped spacers that substantially maintain intervals between the lower mother substrate 1 and the upper mother substrate 2.

The first short spacers 620 are disposed overlapping the first lower panel voltage application pad 129 and the second lower panel voltage application pad 179 of the lower mother substrate 1.

The second short spacer 660 is disposed overlapping the lower panel voltage application wiring 136 of the lower mother substrate 1. The second short spacer 660 may be disposed overlapping the expanded portion of the lower panel voltage application wiring 136 of the lower mother substrate 1.

The third short spacer 680 is disposed overlapping the upper panel voltage application wiring 138 of the lower mother substrate 1. The third short spacer 680 may be disposed overlapping the expanded portion of the upper panel voltage application wiring 138 of the lower mother substrate 1.

Next, a sealant is applied on one of the lower mother substrate 1 and the upper mother substrate 2 at a portion surrounding the lower cell 100 or the upper cell 200.

In an exemplary embodiment, a liquid crystal mixture including the liquid crystal is applied on one of the lower mother substrate 1 and the upper mother substrate 2 using a dispensing process, and the like, and then a mother substrate assembly is provided by combining the lower mother substrate 1 and the upper mother substrate 2. In such an embodiment, end portions of the lower panel voltage application wiring 136 and the upper panel voltage application wiring 138 of the lower mother substrate 1 are not covered by the upper mother substrate 2 to be exposed.

In an alternative exemplary embodiment, the liquid crystal layer may be provided by interposing the liquid crystal mixture between the lower mother substrate 1 and the upper mother substrate 2 through an injection processing after combining the lower mother substrate 1 and the upper mother substrate 2.

Accordingly, the lower cell 100 and the upper cell 200, which are disposed opposite to, e.g., facing, each other, collectively define a cell 300 together with the liquid crystal layer interposed between the lower cell 100 and the upper cell 200.

The liquid crystal may have dielectric anisotropy. The liquid crystal mixture may further include alignment supporting agents. The alignment supporting agents may be a reactive monomer, and may include, for example, an ultraviolet ray curable monomer. The liquid crystal mixture may also include an initiator for curing ultraviolet ray. The ultraviolet ray curable monomer may be, for example, an acrylate-based monomer, and the initiator for curing ultraviolet ray may include a material absorbable in an ultraviolet ray region and may include, for example, 2,2-dimethoxy-1,2-diphenyl ethanone.

In an exemplary embodiment, the alignment supporting agents may be included in the lower alignment layer 11 and the upper alignment layer 21. In an alternative exemplary embodiment, the alignment supporting agents may be included in the liquid crystal mixture as described above. In another alternative exemplary embodiment, the alignment supporting agents may be included in both of the alignment layers 11 and 21 and the liquid crystal mixture. Hereinafter, an exemplary embodiment in which the alignment supporting agents are included in the liquid crystal mixture will be described in detail.

Referring to FIG. 11, the first short spacers 620 electrically connect the first lower panel voltage application pad 129 and the second lower panel voltage application pad 179 of the lower mother substrate 1 and the lower panel connecting bridge 276 of the upper mother substrate 2 facing the first lower panel voltage application pad 129 and the second lower panel voltage application pad 179 of the lower mother substrate 1. The second short spacer 660 electrically connects the lower panel voltage application wiring 136 of the lower mother substrate 1 and the lower panel connecting bridge 276 of the upper mother substrate 2 facing the lower panel voltage application wiring 136 of the lower mother substrate 1. The third short spacer 680 electrically connects the upper pane voltage application wiring 138 of the lower mother substrate 1 and the upper panel connecting bridge 272 of the upper mother substrate 2 facing the upper pane voltage application wiring 138 of the lower mother substrate 1.

Accordingly, the lower panel voltage application wiring 136 of the lower mother substrate 1 is electrically connected with the first lower panel voltage application pad 129 and the second lower panel voltage application pad 179 through the lower panel connecting bridge 276. The upper panel voltage application wiring 138 of the lower mother substrate 1 is electrically connected with the opposing electrode 270 of the cell 300 through the upper panel connecting bridge 272.

Next, as illustrated in FIG. 12, a voltage for the pretilt of the liquid crystal is applied to the end portions of the lower panel voltage application wiring 136 and the upper panel voltage application wiring 138 through a probe for voltage application. Size of the voltages for the pretilt of the liquid crystal applied to the lower panel voltage application wiring 136 and the upper panel voltage application wiring 138 may be different. In one exemplary embodiment, for example, a voltage applied to the lower panel voltage application wiring 136 may be a ground voltage, e.g., about zero (0) volt (V), and a voltage applied to the upper panel voltage application wiring 138 may be a voltage greater than about zero (0) V, for example, about 9.5 V.

Then, as illustrated in FIG. 13, the voltage of the lower panel voltage application wiring 136 may be transmitted to the first lower panel voltage application pad 129 and the second lower panel voltage application pad 179 through the lower panel connecting bridge 276, and transmitted further to the gate line 121 and the data line 171 of the cell 300. The voltage transmitted through the gate line 121 turns on a switching element Q of each pixel PX, and the voltage transmitted through the data line 171 is transmitted to the pixel electrode 191 of each pixel PX through the turned-on switching element Q.

The voltage of the upper panel voltage application wiring 138 may be transmitted to the opposing electrode 270 through the upper panel connecting bridge 272 as illustrated in FIG. 14.

Accordingly, a voltage difference is generated between the pixel electrode 191 and the opposing electrode 270 facing each other, and an electric field is generated in the liquid crystal layer interposed between the pixel electrode 191 and the opposing electrode 270.

The alignment supporting agents of the liquid crystal layer or the alignment supporting agent of the alignment layers 11 and 21 are cured in a state where the electric field is generated in the liquid crystal layer. In an exemplary embodiment, where the alignment supporting agents are the ultraviolet ray curable monomer, light, such as ultraviolet ray, may be irradiated to the liquid crystal layer of the mother substrate assembly to cure the alignment supporting agents. In an exemplary embodiment, a sealant may be simultaneously cured when the alignment supporting agents are cured. In such an embodiment, light, such as ultraviolet lays, is irradiated from the side of the lower mother substrate 1.

A process for providing the pretilt of the liquid crystal of the liquid crystal layer, that is, a process of aligning the liquid crystals, including a process of curing the alignment supporting agents, will be described with reference to FIGS. 15A and 15B together with the drawings illustrated in FIGS. 10 to 14.

FIGS. 15A and 15B are cross-sectional views illustrating a process of aligning liquid crystals of an exemplary embodiment of the method of manufacturing the liquid crystal display according to the invention.

First, referring to FIG. 15A, as described above, the electric field is generated in the liquid crystal layer 3 by applying a voltage for the pretilt of the liquid crystals to the lower panel voltage application wiring 136 and the upper panel voltage application wiring 138 after preparing the liquid crystal layer 3 including liquid crystals 31 and the alignment supporting agents 33 between the lower mother substrate 1 and the upper mother substrate 2. Then, the liquid crystals 31 are tilted in response to the electric field. In such an embodiment, when light, such as ultraviolet rays, is irradiated to the liquid crystal layer 3, the alignment supporting agents 33 are cured in a state where the alignment supporting agents 33 are tilted corresponding to the tilted liquid crystal 31 to form polymers 43 and 53. The alignment supporting agents 33 adjacent to the lower alignment layer 11 and the upper alignment layer 21 may be cured in a direction substantially vertical to the lower mother substrate 1 and the upper mother substrate 2, and the alignment supporting agents 33 may be cured in a tilted state together with the liquid crystals 31, as becoming far from the lower alignment layer 11 and the upper alignment layer 21.

In such an embodiment, when the electric field is removed from the liquid crystal layer 3, the liquid crystals 31 may maintain a pretilted alignment state by the cured alignment supporting agents, that is, the polymers 43 and 53. When the electric field is generated in the liquid crystal layer 3 when the liquid crystal display is driven after manufacturing the liquid crystal display, the liquid crystals 31 may be directly tilted in a predetermined direction corresponding to the pretilt angle, thereby substantially improving a response speed of the liquid crystal display and substantially decreasing an after-image.

In an alternative exemplary embodiment, referring to FIG. 15B, as described above, the electric field is generated in the liquid crystal layer 3 by providing the liquid crystal layer 3 including the liquid crystals 31 between the lower mother substrate 1 and the upper mother substrate 2, on which the lower alignment layer 11 and the upper alignment layer 21 including the alignment supporting agents 33 are disposed, and then applying a voltage for pretilt of the liquid crystals to the lower panel voltage application wiring 136 and the upper panel voltage application wiring 138. Then, the liquid crystals 31 are tilted in response to the electric field. When light, such as ultraviolet rays, is irradiated to the liquid crystal layer 3, the alignment supporting agents 33 of the alignment layers 11 and 21 are cured in a state where the alignment supporting agents 33 are connected with the tilted liquid crystals 31 to form the polymers 53. The polymers 53 may be connected with side-chains of the alignment layers 11 and 21.

In such an embodiment, when the electric field is removed from the liquid crystal layer 3, the liquid crystals 31 may maintain a pretilted alignment state by the cured alignment supporting agents, that is, the polymers 53.

When the curing process of the alignment supporting agents 33 is completed as described above, each liquid display panel may be provided by cutting the mother substrate assembly in the unit of the cell 300, and the liquid crystal display is provided by disposing a backlight unit including a light source, e.g., a lamp, on a rear surface of the liquid crystal panel.

In an exemplary embodiment, where the color filter 230 is disposed on the upper mother substrate 2, when light is irradiated from the side of the upper mother substrate 2, the color filter 230 may absorb the light, such as ultraviolet rays, such that the light may not be sufficiently irradiated to the liquid crystal layer 3. In such an embodiment, the light, such as ultraviolet rays, for curing the alignment supporting agents 33 may be irradiated from the side of the lower mother substrate 1, such that the light may be sufficiently irradiated to the liquid crystal layer 3, and thus the liquid crystals may be sufficiently pretilted.

In an exemplary embodiment, the lower mother substrate 1 is disposed in an upper side and the upper mother substrate 2 is disposed on a lower side in equipment for irradiating light, such as ultraviolet rays, from the upper side, and the voltage for the pretilt of the liquid crystal is applied to the lower mother substrate 1 from the lower side. According to an exemplary embodiment of the invention, when the voltages for the pretilt of the liquid crystals are applied to the lower panel voltage application wiring 136 and the upper panel voltage application wiring 138 disposed on the lower mother substrate 1, the voltages may be transmitted to the lower mother substrate 1 and the upper mother substrate 2 through the upper panel connecting bridge 272 and the lower panel connecting bridge 276, respectively, such that the voltages for the pretilt of the liquid crystals are applied to the lower mother substrate 1 and the upper mother substrate 2, respectively, even without dividing the opposing electrode 270 of the upper mother substrate 2 into regions by cutting the opposing electrode 270 of the upper mother substrate 2 or using other units, thereby substantially simplifying the process of aligning the liquid crystals.

Next, an alternative exemplary embodiment of a method of manufacturing the liquid crystal display according to the invention will be described with reference to FIG. 16 as well as FIGS. 1 to 15.

Figure 16:
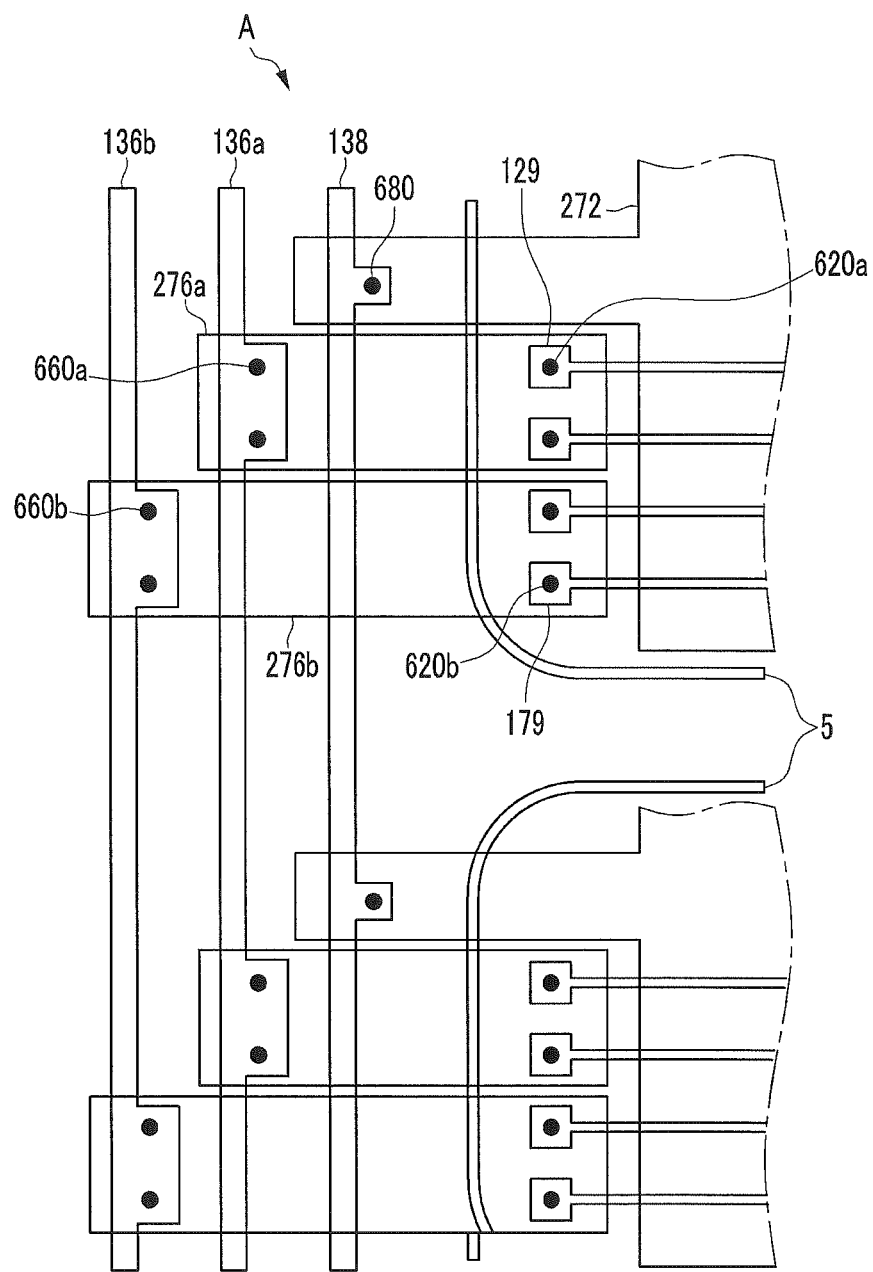
FIG. 16 is a top plan view of a portion of a lower mother substrate and a upper mother substrate bonded together in an exemplary embodiment of a method of manufacturing a liquid crystal display according to the invention.

FIG. 16 is a top plan view of a portion of the lower mother substrate and the upper mother substrate, which are bonded together, in a process of an alternative exemplary embodiment of a method of manufacturing a liquid crystal display according to the invention.

The method of manufacturing the liquid crystal display in FIG. 16 is substantially similar to the methods of manufacturing the liquid crystal display shown in FIGS. 1 to 15 except the structure of the lower mother substrate 1 and the upper mother substrate 2. The same or like elements shown in FIG. 16 have been labeled with the same reference characters as used above to describe the exemplary embodiments of a method of manufacturing the liquid crystal display shown in FIGS. 1 to 15, and any repetitive detailed description thereof will hereinafter be omitted or simplified.

Referring to FIG. 16, pairs of lower panel voltage application wings, e.g., pairs of first lower panel voltage application wirings 136a and second lower panel voltage application wirings 136b, a plurality of upper panel voltage application wirings 138, a first lower panel voltage application pad 129, e.g., one or more first lower panel application pads 129, and a second lower panel voltage application pad 179, e.g., one or more second lower panel voltage application pads 179, are provided on the lower mother substrate 1.

In an exemplary embodiment, the pairs of first lower panel voltage application wirings 136a and second lower panel voltage application wirings 136b, and the plurality of upper panel voltage application wirings 138 may be disposed between the adjacent lower cells 100 and vertically extend substantially in a column direction. Hereinafter, described for convenience of description, an exemplary embodiment of the invention, where the pairs of first lower panel voltage application wirings 136a and second lower panel voltage application wirings 136b, and the plurality of upper panel voltage application wirings 138 are wirings for applying voltages to the lower cells 100 disposed in the right side thereof, will be.

Each of the pairs of first lower panel voltage application wirings 136a and second lower panel voltage application wirings 136b, and the plurality of upper panel voltage application wirings 138 may include a plurality of expanded portions for connection to another layer.

Both ends of each of the pairs of first lower panel voltage application wirings 136a and second lower panel voltage application wirings 136b, and the plurality of upper panel voltage application wirings 138 are disposed along opposing edge sides of the lower mother substrate 1, and may receive a voltage from the outside.

The pairs of first lower panel voltage application wirings 136a and second lower panel voltage application wirings 136b, and the plurality of upper panel voltage application wirings 138 may include substantially the same material as the plurality of signal lines, such as the gate line 121 or the data line 171, of the lower cell 100, and may be provided together with the plurality of signal lines in the same process. In an alternative exemplary embodiment, the pairs of first lower panel voltage application wirings 136a and second lower panel voltage application wirings 136b, and the plurality of upper panel voltage application wirings 138 may be provided in a different process from a process for providing the plurality of signal lines.

The plurality of upper panel connecting bridges 272 and pairs of lower panel connecting bridges, e.g., first lower panel connecting bridges 276a and second lower panel connecting bridges 276b, are disposed on the upper mother substrate 2.

In an exemplary embodiment, an upper panel connecting bridge 272 is connected to the opposing electrode 270 of the corresponding upper cell 200 and may include substantially the same material as the opposing electrode 270 and may be provided together with the opposing electrode 270 in the same process. The upper panel connecting bridge 272 overlaps a portion of the upper panel voltage application wiring 138 of the lower mother substrate 1. In one exemplary embodiment, for example, the upper panel connecting bridge 272 may overlap the expanded portion of the corresponding upper panel voltage application wiring 138 of the lower mother substrate 1.

The pairs of first lower panel connecting bridge 276a and second lower panel connecting bridges 276b are provided in the form of an island electrically and physically separated from the upper panel connecting bridge 272 and the opposing electrode 270. The first lower panel connecting bridge 276a and the second lower panel connecting bridges 276b may include substantially the same material as the upper panel connecting bridge 272 or the opposing electrode 270, and may be provided together with the upper panel connecting bridge 272 or the opposing electrode 270 in the same process.

The first lower panel connecting bridge 276a overlaps a portion of the first lower panel voltage application wiring 136a and the first lower panel voltage application pad 129. In one exemplary embodiment, for example, the first lower panel connecting bridge 276a may overlap the expanded portion of the first lower panel voltage application wiring 136a.

The second lower panel connecting bridge 276b overlaps a portion of the second lower panel voltage application wiring 136b and the second lower panel voltage application pad 179. In one exemplary embodiment, for example, the second lower panel connecting bridge 276b may overlap the expanded portion of the second lower panel voltage application wiring 136b.

Next, as illustrated in FIG. 16, a plurality of short spacers, e.g., a first short spacer 620a, a second short spacer 620b, a third short spacer 660a, a fourth short spacer 660b and a fifth short spacer 680, is provided on the lower mother substrate 1 or the upper mother substrate 2.

The first short spacer 620a is disposed overlapping the first lower panel voltage application pad 129 of the lower mother substrate 1, and the second short spacer 620b is disposed overlapping the second lower panel voltage application pad 179 of the lower mother substrate 1.

The third short spacer 660a is disposed overlapping the first lower panel voltage application wiring 136a of the lower mother substrate 1, and the fourth short spacer 660b is disposed overlapping the second lower panel voltage application wiring 136b of the lower mother substrate 1. The third and fourth short spacers 660a and 660b may be disposed overlapping the expanded portions of the first lower panel voltage application wiring 136a and the second lower panel voltage application wiring 136b.

The fifth short spacer 680 may be disposed overlapping the upper panel voltage application wiring 138 of the lower mother substrate 1, e.g., overlapping the expanded portion of the upper panel voltage application wiring 138.

In an exemplary embodiment, when the mother substrate assembly is provided by combining the lower mother substrate 1 and the upper mother substrate 2, the first short spacer 620a electrically connects the first lower panel voltage application pad 129 of the lower mother substrate 1 and the first lower panel connecting bridge 276a of the upper mother substrate 2 facing the first lower panel voltage application pad 129 of the lower mother substrate 1, and the second short spacer 620b electrically connects the second lower panel voltage application pad 179 of the lower mother substrate 1 and the second lower panel connecting bridge 276b of the upper mother substrate 2 facing the second lower panel voltage application pad 179 of the lower mother substrate 1. In such an embodiment, the third short spacer 660a electrically connects the first lower panel voltage application wiring 136a of the lower mother substrate 1 and the first lower panel connecting bridge 276a of the upper mother substrate 2 facing the first lower panel voltage application wiring 136a of the lower mother substrate 1, and the fourth short spacer 660b electrically connects the second lower panel voltage application wiring 136b of the lower mother substrate 1 and the second lower panel connecting bridge 276b of the upper mother substrate 2 facing the second lower panel voltage application wiring 136b of the lower mother substrate 1. In such an embodiment, the fifth short spacer 680 electrically connects the upper panel voltage application wiring 138 of the lower mother substrate 1 and the upper panel connecting bridge 272 of the upper mother substrate 2 facing the upper panel voltage application wiring 138 of the lower mother substrate 1.

Accordingly, as illustrated in FIG. 16, the first lower panel voltage application wiring 136a of the lower mother substrate 1 is electrically connected to the first lower panel voltage application pad 129 through the first lower panel connecting bridge 276a, and the second lower panel voltage application wiring 136b is electrically connected to the second lower panel voltage application pad 179 through the second lower panel connecting bridge 276b. The upper panel voltage application wiring 138 of the lower mother substrate 1 is electrically connected to the opposing electrode 270 of the cell 300 through the upper panel connecting bridge 272.

The liquid crystals 31 may be pretilted by curing the alignment supporting agents by irradiating light, such as ultraviolet rays, after applying the voltages for the pretilt of the liquid crystals to the combined lower mother substrate 1 and upper mother substrate 2, as described above.

According to an exemplary embodiment of the invention, different voltages may be applied to the gate line 121 and the data line 171 through the first and second lower panel voltage application wirings 136a and 136b. Accordingly, in such an embodiment, the pixels PX of the cells 300 are driven in the process of aligning the liquid crystals in a similar way as in the actual driving of the liquid crystal display, thereby effectively preventing texture defect, gamma distribution weakness, or the like.

Then, another alternative exemplary embodiment of a method of manufacturing the liquid crystal display according to the invention will be described with reference to FIGS. 17 to 26.

Figure 17:
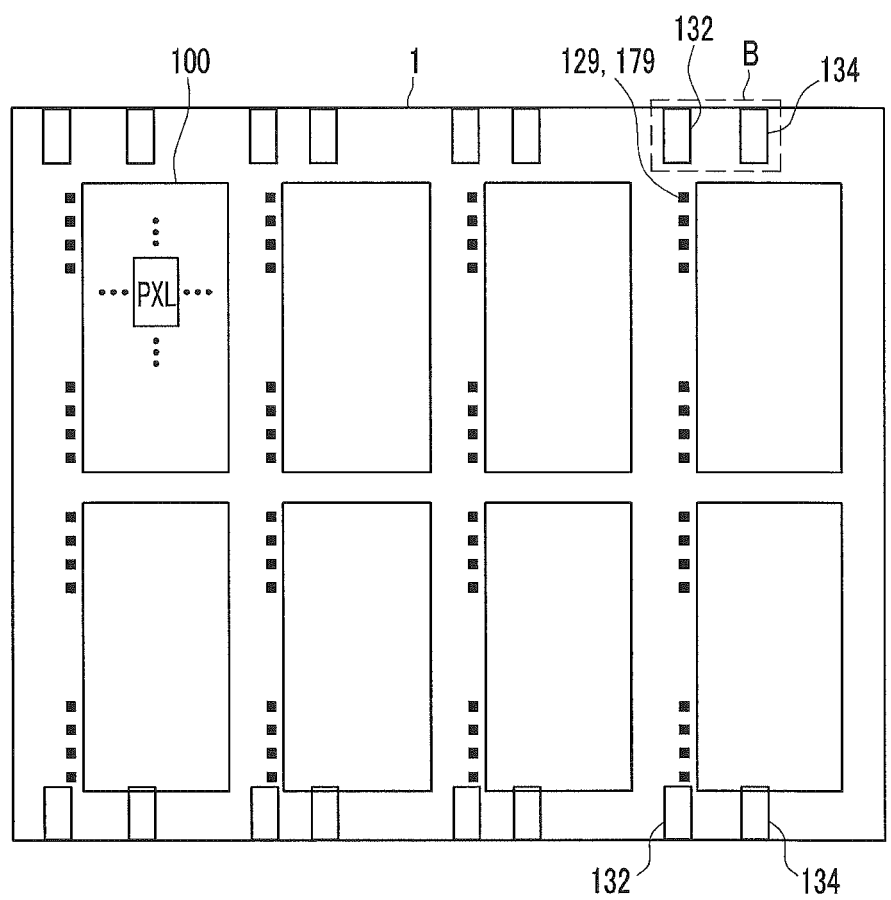
FIG. 17 is a block diagram showing a lower mother substrate in a process of an exemplary embodiment of a method of manufacturing a liquid crystal display according to the invention.
Figure 18:
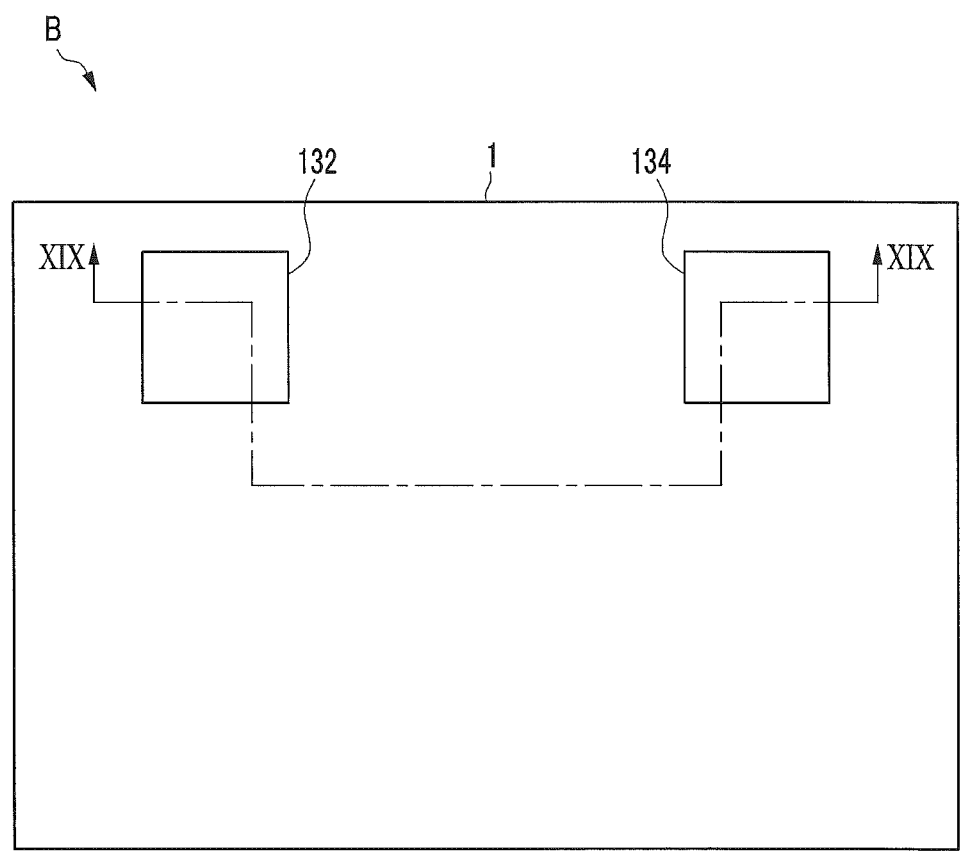
FIG. 18 is an enlarged top plan view of portion B of FIG. 17.
Figure 19:
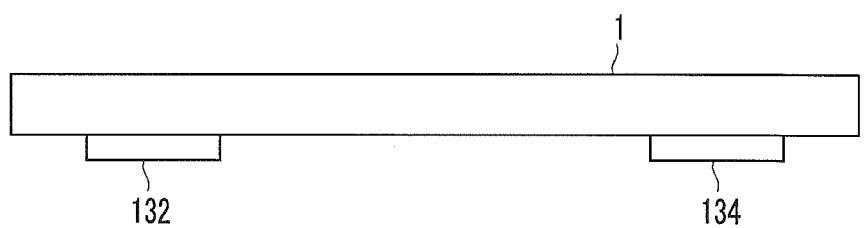
FIG. 19 is a cross-sectional view taken along line XIX-XIX of the lower mother substrate of FIG. 18.
Figure 20:
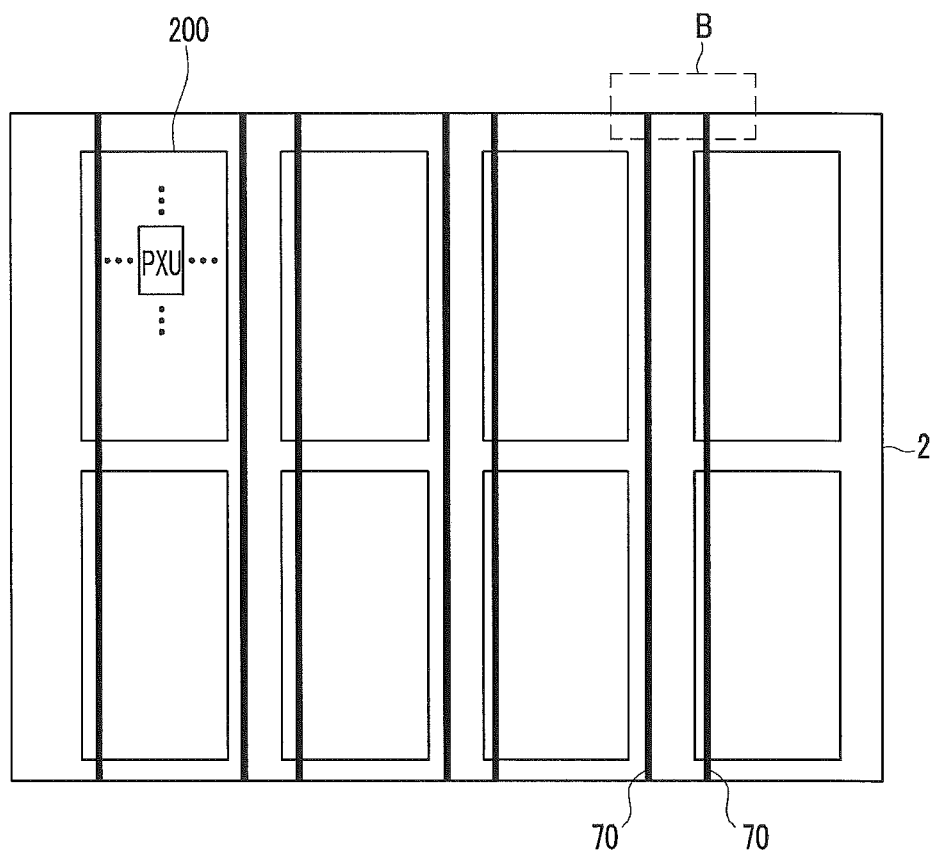
FIG. 20 is a block diagram showing the upper mother substrate in a process of an exemplary embodiment of the method of manufacturing the liquid crystal display according to the invention.
Figure 21:
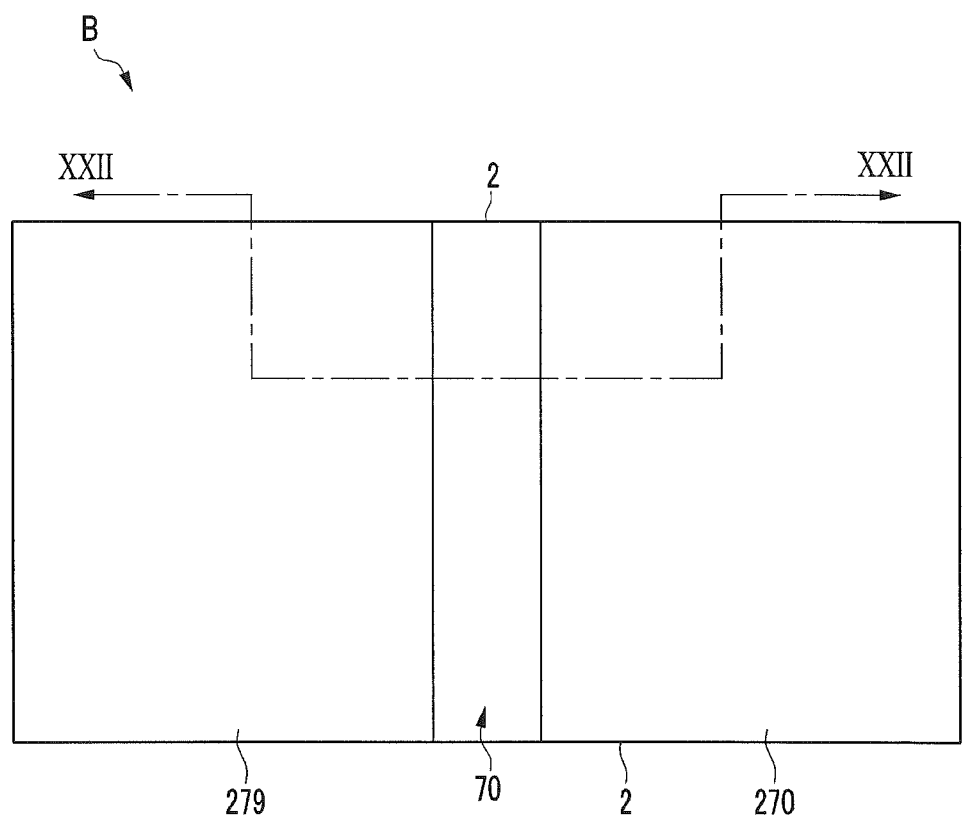
FIG. 21 is an enlarged top plan view of portion B of FIG. 20.
Figure 22:
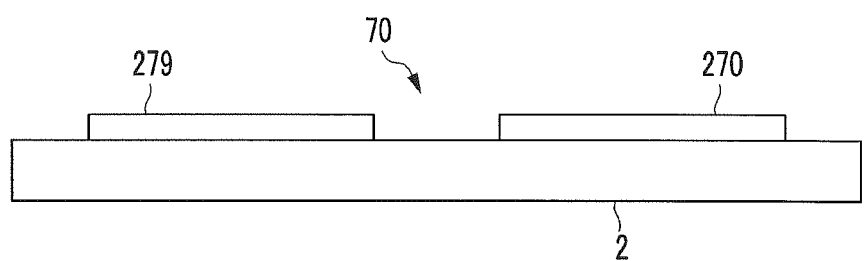
FIG. 22 is a cross-sectional view taken along line XXII-XXII of the upper mother substrate of FIG. 21.
Figure 23:
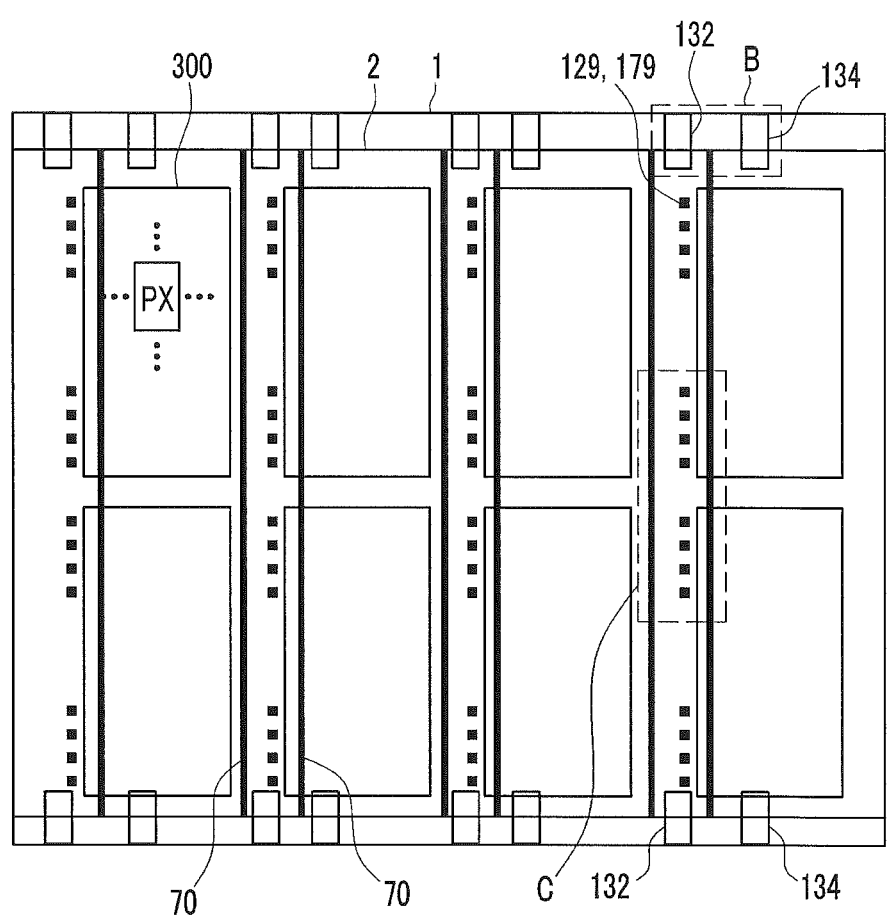
FIG. 23 is a block diagram showing a lower mother substrate and a upper mother substrate bonded together in a process of an exemplary embodiment of the method of manufacturing the liquid crystal display according to the invention.
Figure 24:
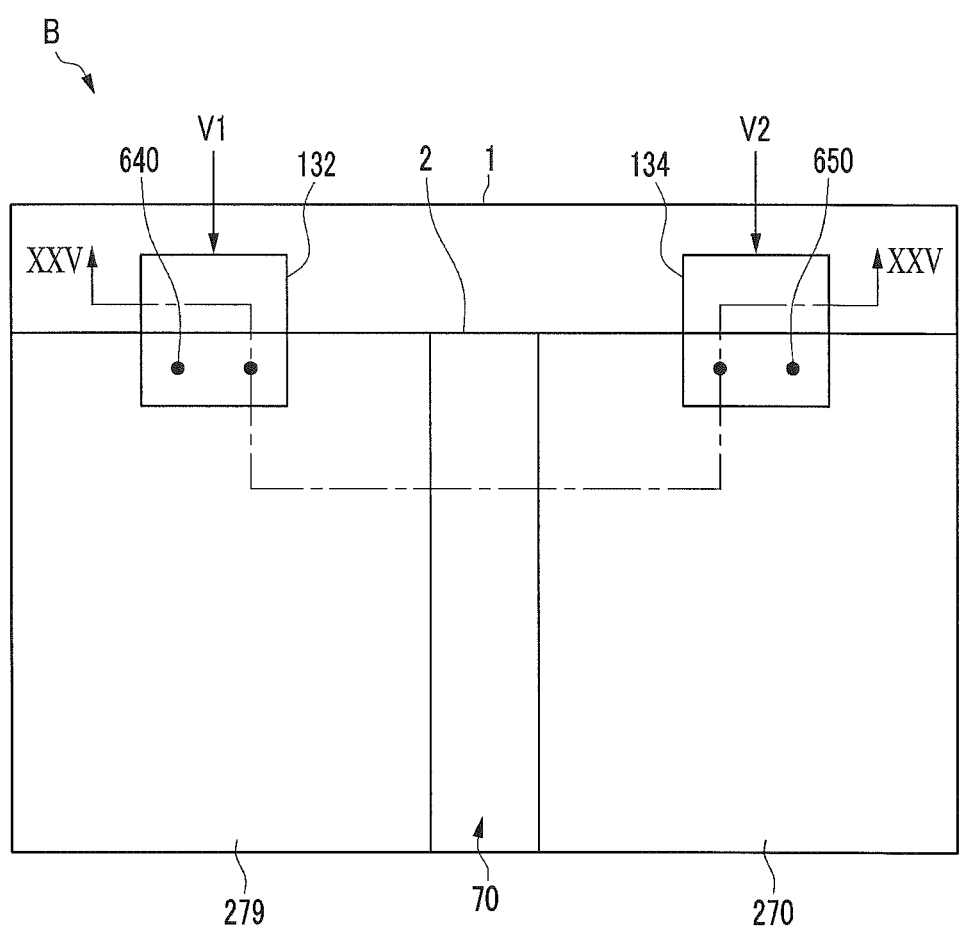
FIG. 24 is an enlarged top plan view of portion B of FIG. 23.
Figure 25:
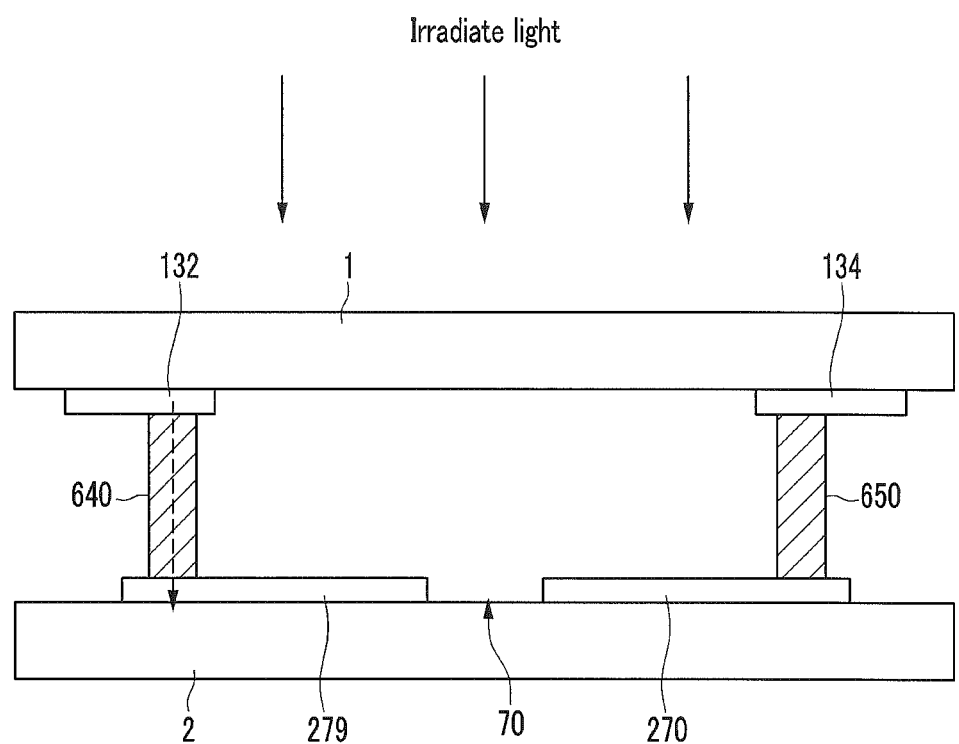
FIG. 25 is a cross-sectional view taken along line XXV-XXV of the lower mother substrate and the upper mother substrate of FIG. 24.
Figure 26:
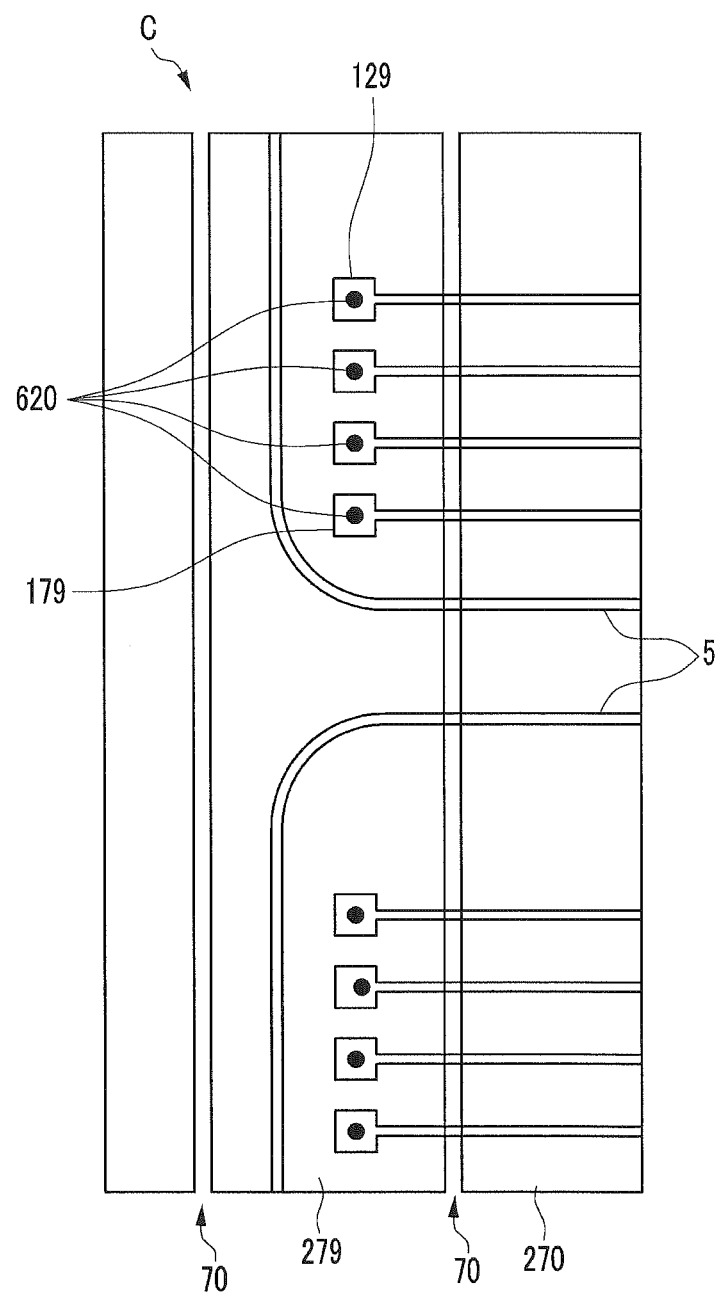
FIG. 26 is an enlarged top plan view of portion C of FIG. 23.

FIG. 17 is a block diagram showing a lower mother substrate in a process of an alternative exemplary embodiment of a method of manufacturing a liquid crystal display according to the invention, FIG. 18 is an enlarged top plan view of portion B of FIG. 17, FIG. 19 is a cross-sectional view taken along line XIX-XIX of the lower mother substrate of FIG. 18, FIG. 20 is a block diagram showing the upper mother substrate in a process of an exemplary embodiment of the method of manufacturing the liquid crystal display according to the invention, FIG. 21 is an enlarged top plan view of portion B of FIG. 20, FIG. 22 is a cross-sectional view taken along line XXII-XXII of the upper mother substrate of FIG. 21, FIG. 23 is a block diagram showing the lower mother substrate and the upper mother substrate bonded together in a process of an exemplary embodiment of the method of manufacturing the liquid crystal display according to the invention, FIG. 24 is an enlarged top plan view of portion B of FIG. 23, FIG. 25 is a cross-sectional view taken along line XXV-XXV of the lower mother substrate and the upper mother substrate of FIG. 24 in an exemplary embodiment of a process of aligning liquid crystals of the liquid crystal display according to the invention, and FIG. 26 is an enlarged top plan view of portion C of FIG. 23.

The method of manufacturing the liquid crystal display in FIGS. 17 to 26 is substantially similar to the methods of manufacturing the liquid crystal display shown in FIGS. 1 to 15 except for voltage application electrodes. The same or like elements shown in FIGS. 17 to 26 have been labeled with the same reference characters as used above to describe the exemplary embodiments of a method of manufacturing the liquid crystal display shown in FIGS. 1 to 15, and any repetitive detailed description thereof will hereinafter be omitted or simplified.

First, referring to FIGS. 17 to 19, the lower mother substrate 1 including the plurality of lower cells 100 arranged substantially in a matrix form is prepared.

Pairs of lower panel voltage application electrodes 132 and upper panel voltage application electrodes 134 are provided on the lower mother substrate 1 at near opposing edges thereof. The lower panel voltage application electrodes 132 are arranged in a column direction between the lower cells 100 adjacent to each other in a row direction, and the upper panel voltage application electrodes 134 are arranged with the lower cells 100 in a column direction.

Each of the lower panel voltage application electrode 132 and the upper panel voltage application electrode 134 may receive a voltage from the outside, e.g., from a voltage application unit. In an exemplary embodiment, the lower panel voltage application electrodes 132 and the upper panel voltage application electrodes 134 may be disposed at both opposing edges of the lower mother substrate 1 as illustrated in FIG. 17, but not being limited thereto. In an alternative exemplary embodiment, the lower panel voltage application electrodes 132 and the upper panel voltage application electrodes 134 may be disposed at one edge of the lower mother substrate 1.

The lower panel voltage application electrodes 132 and the upper panel voltage application electrodes 134 may include the same material as the plurality of signal lines, such as the gate line 121 and the data line 171, of the lower cell 100, and may be provided together with the plurality of signal lines in the same process. In an alternative exemplary embodiment, the lower panel voltage application electrodes 132 and the upper panel voltage application electrodes 134 may be provided in a process different from the process for providing the plurality of the signal lines.

A first lower panel voltage application pad 129 (e.g., one or more first lower panel voltage application pads) and a second lower panel voltage application pad 179 (e.g., one or more second panel voltage application pads) are provided on the lower mother substrate 1. The first lower panel voltage application pad 129 and the second lower panel voltage application pad 179 may be arranged in a column direction at near a side of each of the lower cells 100.

The first lower panel voltage application pad 129 and the second lower panel voltage application pad 179 are connected to the signal lines of the lower cell 100. In an exemplary embodiment, the first lower panel voltage application pad 129 may be connected to the gate line 121 of the lower cell 100, and the second lower panel voltage application pad 179 may be connected to the data line 171 of the lower cell 100.

Next, a lower alignment layer (not illustrate) is provided on the lower mother substrate 1. The lower alignment layer may be a vertical alignment layer or a horizontal alignment layer, and include alignment supporting agents, such as reactive monomer.

Next, referring to FIGS. 20 to 22, the upper mother substrate 2, on which the plurality of upper cells 200 corresponding to the lower cells 100 of the lower mother substrate 1 and arranged substantially in a matrix form, is prepared. A size of the upper mother substrate 2 may be smaller than a size of the lower mother substrate 1.

The plurality of opposing electrodes 270 and a plurality of voltage transmission electrodes 279, including a transparent conductive material, such as ITO and IZO and disposed on the same layer as the plurality of opposing electrodes 270, are provided on the upper mother substrate 2. The opposing electrodes 270 and the voltage transmission electrodes 279 are alternately arranged in a row direction as illustrated in FIG. 20, and are electrically insulated from each other with cutting lines 70 interposed therebetween. The opposing electrodes 270 are provided on most regions of the upper cells 200, and the voltage transmission electrodes 279 are vertically extending in the column direction along the column of the adjacent upper cells 200 at a right side or a left side thereof.

A pair of cut lines 70 may be disposed between the upper cells 200 adjacent in the row direction. A first cutting line 70 of the pair of cutting lines 70 may overlap the upper cell 200 as illustrated in FIG. 20.

In an exemplary embodiment, the opposing electrodes 270 and the voltage transmission electrodes 279 may be patterned by stacking the transparent conductive material, such as ITO and IZO, on the upper mother substrate 2 to form a transparent conductive material layer and cutting the transparent conductive material layer along the cutting lines 70 by laser, and the like. The opposing electrode 270 is patterned to at least partially overlap the upper panel voltage application electrode 134 of the lower mother substrate 1 facing the opposing electrode 270, and the voltage transmission electrode 279 is patterned to overlap the lower panel voltage application electrode 132 of the lower mother substrate 1.

Next, an upper alignment layer (not illustrated) is provided on the upper mother substrate 2. The upper alignment layer may be a vertical alignment layer or a horizontal alignment layer, and may include alignment supporting agents, such as reactive monomer.

Next, referring to FIGS. 23 to 26, the plurality of short spacers, e.g., first short spacers 620, a second short spacer 640 and a third short spacer 650, is provided on the lower mother substrate 1 or the upper mother substrate 2.

The first short spacers 620 are disposed overlapping the first lower panel voltage application pad 129 and the second lower panel voltage application pad 179 of the lower mother substrate 1.

The second short spacer 640 is disposed overlapping the lower panel voltage application electrode 132 of the lower mother substrate 1 and the voltage transmission electrode 279 of the upper mother substrate 2, and the third short spacer 650 is disposed overlapping the upper panel voltage application electrode 134 of the lower mother substrate 1 and the opposing electrode 270 of the upper mother substrate 2.

Next, a sealant is applied on the lower mother substrate 1 or the upper mother substrate 2 to enclose the lower cell 100 or the upper cell 200.

Subsequently, a liquid crystal mixture including the liquid crystal is applied on the lower mother substrate 1 or the upper mother substrate 2 using a dispensing process, and the like, and then a mother substrate assembly is formed by combining the lower mother substrate 1 and the upper mother substrate 2. In such an embodiment, end portions of the lower mother substrate 1 are not covered by the upper mother substrate 2 to be exposed such that at least a portion of the lower panel voltage application electrode 132 and the upper panel voltage application electrode 134 of the lower mother substrate 1 are exposed. The liquid crystal mixture may further include the alignment supporting agents, such as reactive monomer. In an alternative exemplary embodiment, where the alignment layers coated inside the lower mother substrate 1 and the upper mother substrate 2 include the alignment supporting agents, the liquid crystal mixture does not include the alignment supporting agents.

Accordingly, the lower cell 100 and the upper cell 200 facing each other define one cell 300 together with the liquid crystal layer interposed therebetween.

In such an embodiment, referring to FIGS. 24 and 25, the second short spacer 640 electrically connects the lower panel voltage application electrode 132 of the lower mother substrate 1 and the voltage transmission electrode 279 of the upper mother substrate 2. Similarly, the third short spacer 650 electrically connects the upper panel voltage application electrode 134 of the lower mother substrate 1 and the opposing electrode 270 of the upper mother substrate 2.

Referring to FIG. 26, the first short spacers 620 electrically connect the first and second lower panel voltage application pads 129 and 179 of the lower mother substrate 1 and the voltage transmission electrode 279 of the upper mother substrate 2 facing the first and second lower panel voltage application pads 129 and 179 of the lower mother substrate 1.

Accordingly, the lower panel voltage application electrode 132 of the lower mother substrate 1 is electrically connected to the first lower panel voltage application pad 129 and the second lower panel voltage application pad 179 of the lower mother substrate 1 through the voltage transmission electrode 279 of the upper mother substrate 2. The upper panel voltage application electrode 134 of the lower mother substrate 1 is electrically connected to the opposing electrode 270 through the short spacer 650.

Subsequently, voltages, e.g., a first voltage V1 and a second voltage V2, for the pretilt of the liquid crystals are applied to the lower panel voltage application electrode 132 and the upper panel voltage application electrode 134, respectively, through a probe for applying a voltage. Then, the first voltage V1 applied to the lower panel voltage application electrode 132 may be transmitted to the first lower panel voltage application pad 129 and the second lower panel voltage application pad 179 through the voltage transmission electrode 279, and may be transmitted to the gate lines 121 and the data lines 171 of the cell 300 again. The voltage transmitted through the gate lines 121 turns on the switching element Q of each pixel PX, and the voltage transmitted through the data line 171 is transmitted to the pixel electrode 191 of each pixel PX through the turned-on switching element Q.

The second voltage V2 applied to the upper panel voltage application electrode 134 is transmitted to the opposing electrode 270 of the upper mother substrate 2.

Accordingly, a voltage difference is generated between the pixel electrode 191 and the opposing electrode 270 facing each other, and the electric field is generated in the liquid crystal layer interposed between the pixel electrode 191 and the opposing electrode 270.

The alignment supporting agents are cured in a state where the electric field is generated in the liquid crystal layer as described above. In an exemplary embodiment, where the alignment supporting agents are the ultraviolet ray curable monomer, light, such as ultraviolet ray, may be irradiated to the liquid crystal layer to cure the alignment supporting agents. In such an embodiment, the light, such as ultraviolet lays, is irradiated from the side of the lower mother substrate 1.

According to an exemplary embodiment of the invention, the light, such as ultraviolet rays, for curing the alignment layer or the alignment supporting agents of the liquid crystal layer is irradiated from the side of the lower mother substrate 1, such that the light may be effectively irradiated to the liquid crystal layer 3, and thus the liquid crystals may be effectively pretilted.

In an exemplary embodiment, the lower mother substrate 1 is disposed in an upper side and the upper mother substrate 2 is disposed on a lower side in equipment for irradiating light, such as ultraviolet rays, from the upper side, and the voltage for the pretilt of the liquid crystal is applied to the lower mother substrate 1 from the lower side. In such an embodiment, when the voltages for the pretilt of the liquid crystals are applied to the lower panel voltage application electrode 132 and the upper panel voltage application electrode 134 disposed on the lower mother substrate 1, the voltages may be transmitted to the lower mother substrate 1 and the upper mother substrate 2 through the voltage transmission electrode 279 and the opposing electrode 270, respectively, thereby substantially simplifying the process of aligning the liquid crystals.

Figure 27:
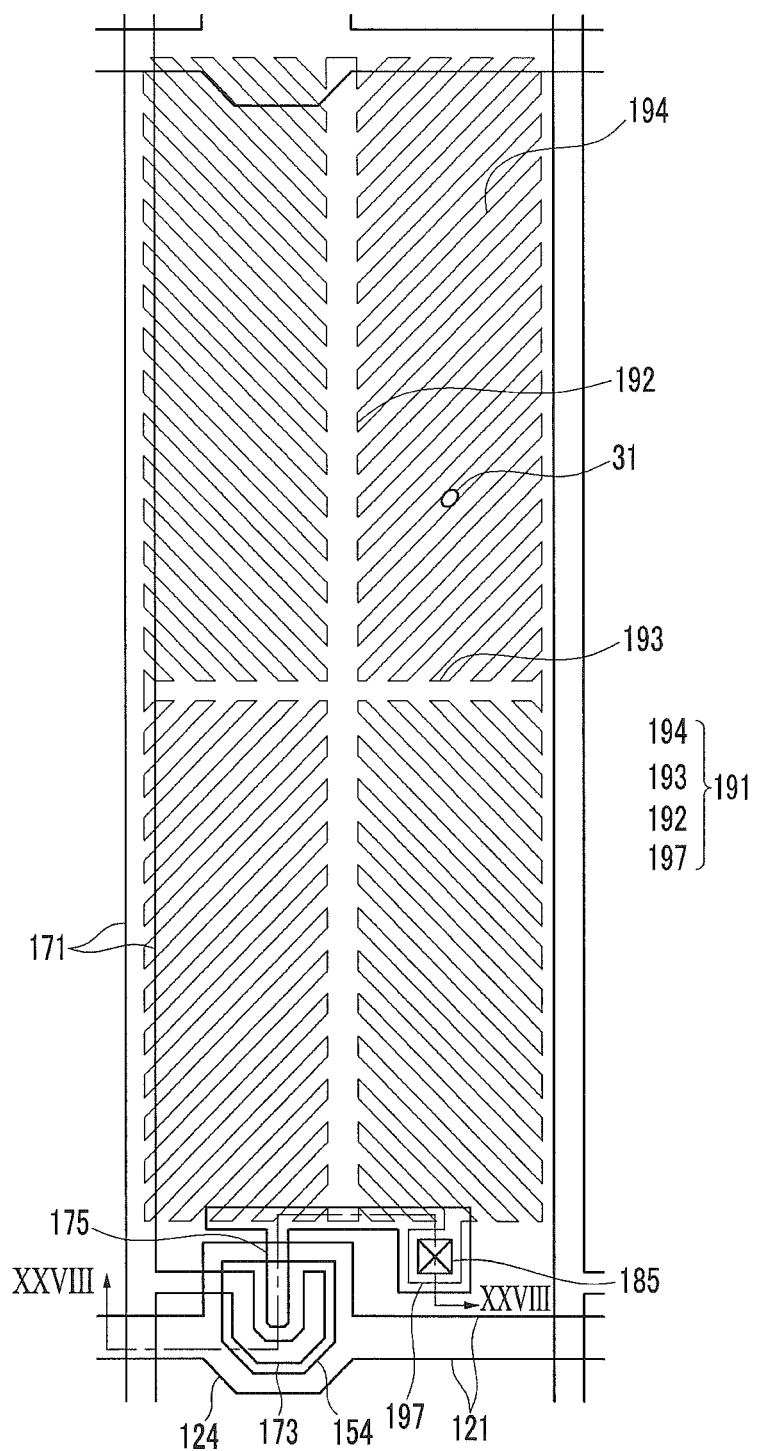
FIG. 27 is a top plan view of a pixel of an exemplary embodiment of a liquid crystal display according to the invention.
Figure 28:
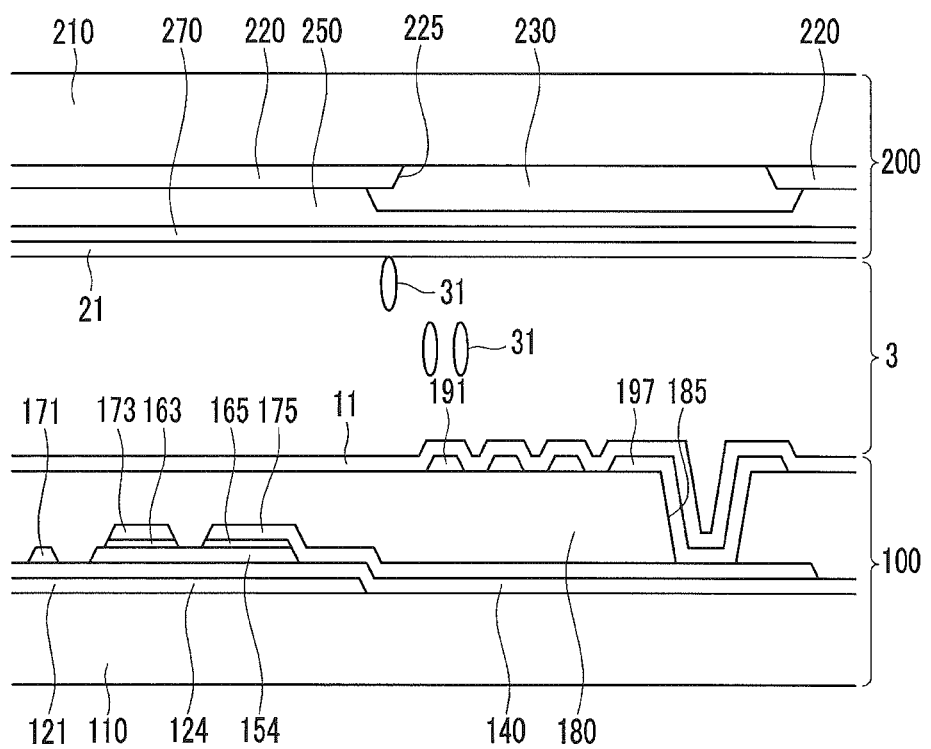
FIGS. 28 and 29 are cross-sectional views taken along line XXVIII-XXVIII of the liquid crystal display of FIG. 27.
Figure 29:
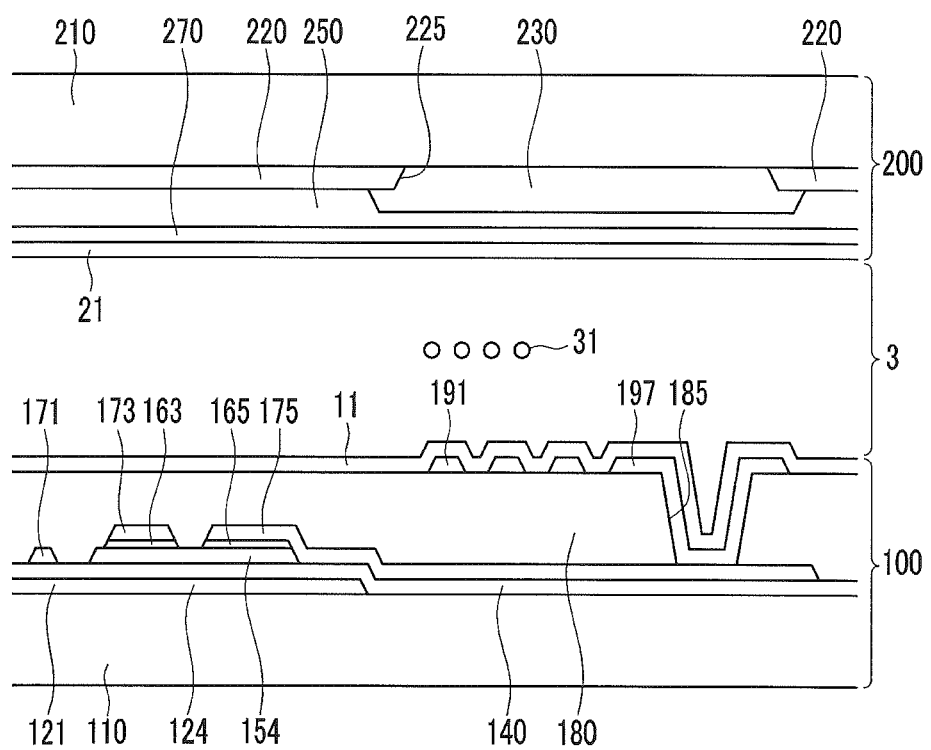

Referring to FIGS. 27 to 29, a structure of the liquid crystal display manufactured by an exemplary embodiment of the method of manufacturing the liquid crystal display according to the invention will be described.

FIG. 27 is a top plane view of one pixel of the liquid crystal display according to the exemplary embodiment of the invention, and FIGS. 28 and 29 are cross-sectional views taken along line XXVIII-XXVIII of the liquid crystal display of FIG. 27.

An exemplary embodiment of the liquid crystal display according to the invention includes the lower display panel 100, the upper display panel 200 disposed opposite to, e.g., facing the lower display panel 100, and the liquid crystal layer 3 interposed between the lower and upper display panels 100 and 200. The lower display panel 100 may be the lower cell 100 of the lower mother substrate 1, and the upper display panel 200 may be the upper cell 200 of the upper mother substrate 2 corresponding to the lower cell 100 of the lower mother substrate 1, as described above.

First, the lower display panel 100 will be described in detail. The gate line 121 including the gate electrode 124 is disposed on an insulating substrate 110 of the lower display panel 100, the gate insulating layer 140 is disposed on the gate line 121, the island-shaped semiconductor 154 including hydrogenated amorphous or polycrystalline silicon or an oxide semiconductor material is disposed on the gate insulating layer 140.

The island-shaped ohmic contact members 163 and 165 may be disposed on the semiconductor 154. The data line 171 and the drain electrode 175 are disposed on the ohmic contact members 163 and 165 and the gate insulating layer 140. The data line 171 includes the source electrode 173 extending toward the gate electrode 124. The drain electrode 175 includes a portion facing the source electrode 173 based on the gate electrode 124.

The gate electrode 124, the source electrode 173 and the drain electrode 175 collectively define the thin film transistor together with the semiconductor 154, and the channel of the thin film transistor is formed in the semiconductor 154 between the source electrode 173 and the drain electrode 175.

The passivation layer 180 including an inorganic insulating material or an organic insulating material is disposed on the data line 171, the drain electrode 175 and the exposed portion of the semiconductor 154. The contact hole 185, through which the drain electrode 175 is exposed, is formed on the passivation layer 180.

The plurality of pixel electrodes 191 including a transparent conductive material, such as ITO or IZO, or reflective metal, such as aluminum, silver, or chrome, or an alloy thereof, is disposed on the passivation layer 180. An overall shape of the pixel electrode 191 may be a quadrangle. The pixel electrode 191 includes a horizontal stem portion 193 and a vertical stem portion 192, which are substantially perpendicular to each other, a plurality of fine branch portions 194, and a protruding portion 197. The pixel electrode 191 is divided into sub areas by the horizontal stem portion 193 and the vertical stem portion 192. The fine branch portions 194 are extending from the horizontal stem portion 193 and the vertical stem portion 192 at a predetermined angle with respect thereto, e.g., an angle of about 45 degrees or about 135 degrees with respect to the vertical stem portion 192 or the horizontal stem portion 193.

The pixel electrode 191 is connected to the drain electrode 175 through the contact hole 185 in the protruding portion 197 at the lower end, and receives data voltage from the drain electrode 175.

The alignment layer 11 is disposed on the pixel electrode 191.

Next, the upper display panel 200 will be described in detail. The light blocking member 220 is disposed on an insulating substrate 210 of the upper display panel 200. The light blocking member 220 prevents light leakage between the pixel electrodes 191 and includes openings 225 for defining opened regions facing the pixel electrodes 191.

The color filter 230 is disposed on the insulating substrate 210 and the light blocking member 220.

The overcoat layer 250 is disposed on the color filter 230 and the light blocking member 220, and the opposing electrode 270 including a transparent conductor, such as ITO and IZO, is disposed on substantially an entire surface of the overcoat layer 250.

The alignment layer 21 is disposed on the opposing electrode 270.

The alignment layers 11 and 21 of the lower and upper display panel 100 and 200 may be vertical alignment layers, and include the alignment supporting agents, such as reactive monomer.

The liquid crystal layer 3 interposed between the lower display panel 100 and the upper display panel 200 includes the liquid crystals 31 having negative dielectric anisotropy. The liquid crystals 31 are aligned with a pretilt angle in a direction substantially parallel to a longitudinal direction of the fine branch portion 194 in a state where no electric field is generated in the liquid crystal layer 3, as illustrated in FIGS. 27 and 28. In such an embodiment, the liquid crystals 31 disposed substantially close to the surfaces of the display panels 100 and 200 may be aligned such that the longitudinal axes of the liquid crystals 31 are aligned substantially perpendicular to the surfaces of the lower and upper display panels 100 and 200 in a state where s no electric field is generated in the liquid crystal layer 3. In an exemplary embodiment, the liquid crystal layer 3 may include the alignment supporting agents, such as reactive monomer. In an alternative exemplary embodiment, where the alignment layers 11 and 21 include the alignment supporting agents, the alignment supporting agents of the liquid crystal layer 3 may be omitted.

An operation of the liquid crystal display will be described. When the data voltage is applied to the pixel electrode 191 through the data line 171 by applying the gate signal to the gate line 121, the pixel electrode 191 generates an electric field in the liquid crystal layer 3 together with the opposing electrode 270 receiving the common voltage. Then, as illustrated in FIG. 28, the liquid crystals 31 arranged substantially perpendicular to the surfaces of the lower and upper display panels 100 and 200 becomes tilted in a pretilt direction in response to the electric field as illustrated in FIG. 29. A degree of a change in polarization of incident light to the liquid crystal layer 3 is changed based on a tilted degree of the liquid crystal 31, and the change in the polarization changes transmissivity of the light passing therethrough by a polarizer, and thus the liquid crystal display displays an image.

Next, referring to FIG. 30, a structure of the liquid crystal display manufactured by an alternative exemplary embodiment of the method of manufacturing the liquid crystal display according to the invention will be described.

Figure 30:
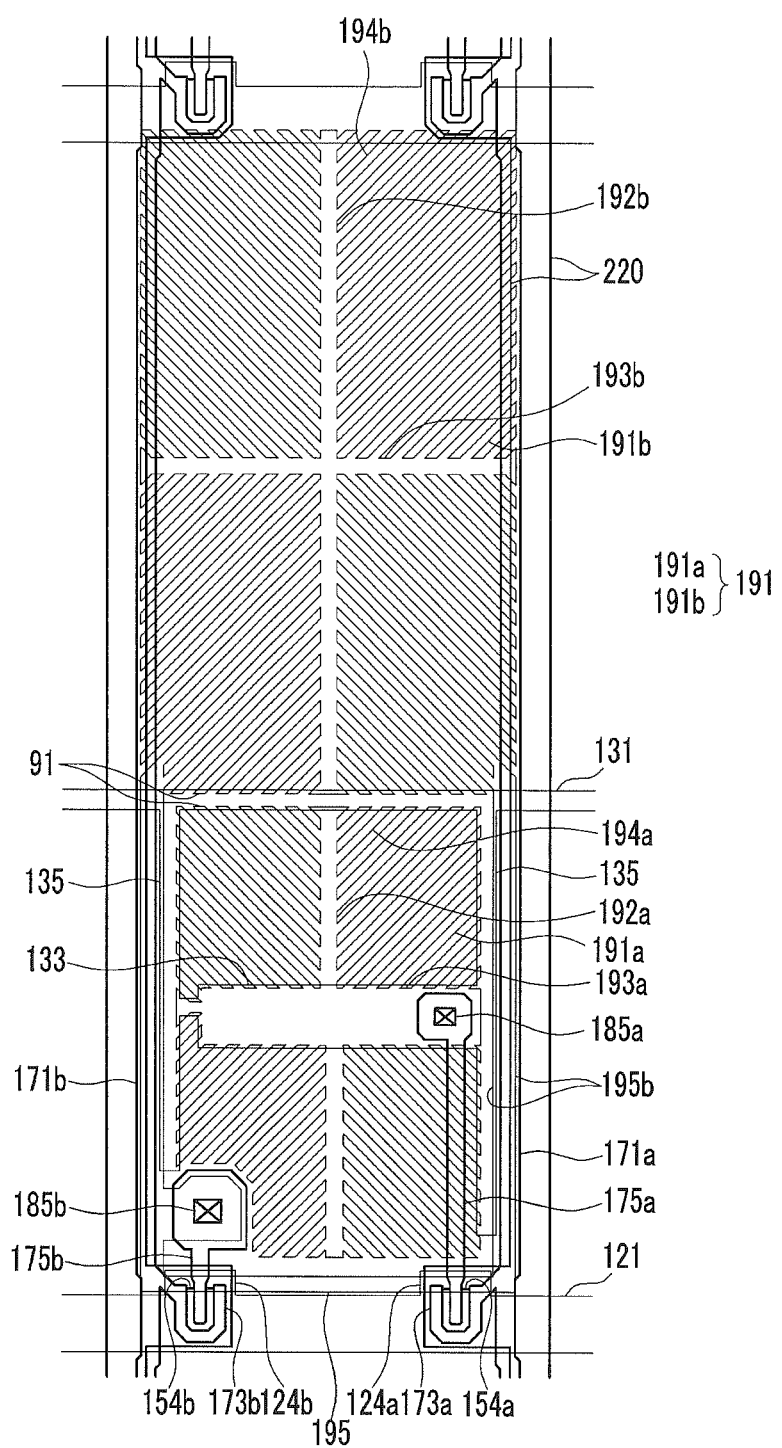
FIG. 30 is a top plan view of a pixel of an alternative exemplary embodiment of a liquid crystal display according to the invention.

FIG. 30 is a top plan view of a pixel of an exemplary embodiment of the liquid crystal display according to the invention.

A layer structure of an exemplary embodiment of the liquid crystal display according to the exemplary embodiment is substantially similar to the liquid crystal display illustrated in FIGS. 27 and 28. The same or like elements shown in FIG. 30 have been labeled with the same reference characters as used above to describe the exemplary embodiments of the liquid crystal display shown in FIGS. 27 to 28, and any repetitive detailed description thereof will hereinafter be omitted or simplified.

Referring to FIG. 30, in an exemplary embodiment, the gate line 121 and a storage electrode line 131 are disposed on an insulating substrate (not shown) of the lower display panel. The gate line 121 includes a first gate electrode 124a and a second gate electrode 124b, and the storage electrode line 131 includes two vertical portions, e.g., left and right vertical portions 135 extending downwardly from the storage electrode line 131, and a storage electrode 133. The storage electrode 133 has a predetermined width for overlapping the pixel electrode 191, which will be described later in greater detail.

The gate insulating layer (not illustrated) is disposed on the gate line 121 and the storage electrode line 131, and a first semiconductor 154a and a second semiconductor 154b are disposed on the gate insulating layer.

A pair of data lines 171a and 171b including a pair of source electrodes 173a and 173b, respectively, and a pair of drain electrodes 175a and 175b are disposed on the first and second semiconductors 154a and 154b.

The passivation layer (not illustrated) is disposed on the data lines 171a and 171b, the drain electrodes 175a and 175b, and exposed portions of the semiconductors 154a and 154b. Contact holes 185a and 185b, through which the first drain electrode 175a and the second drain electrode 175b are exposed, respectively, are formed on the passivation layer.

The pixel electrode 191 is disposed on the passivation layer, and includes first and second sub pixel electrodes 191a and 191b, which are separated from each other with a gap 91 in the form of a quadrangular band. The second sub pixel electrode 191b includes a connection bridge 195b surrounding a least a portion of the first sub pixel electrode 191a in the lower side with the gap 91 therebetween. The second sub pixel electrode 191b receives data voltage from the second drain electrode 175b through the connection bridge 195b.

Both vertical sides of the connection bridge 195b cover the data lines 171a and 171b, thereby effectively preventing crosstalk between the data signal and the first sub pixel electrode 191a.

In an exemplary embodiment, the first and second sub pixel electrodes 191a and 191b of the pixel electrode 191 include vertical stem portions 192a and 192b, horizontal stem portions 193a and 193b, and fine branch portions 194a and 194b, respectively, and the liquid crystals of the liquid crystal layer (not illustrated) are aligned while having a pretilt angle in a direction substantially parallel to the longitudinal directions of the fine branch portions 194a and 194b.

The color filter, the light blocking member, the opposing electrode, the alignment layer, and the like are disposed on the insulating substrate (not illustrated) of the upper display panel as in the exemplary embodiments described above.

While this invention has been described in connection with what is presently considered to be practical exemplary embodiments, it is to be understood that the invention is not limited to the embodiments described herein, but, on the contrary, is intended to cover various modifications and equivalent arrangements included within the spirit and scope of the appended claims.

What is claimed is:

1. A method of manufacturing a liquid crystal display, the method comprising:
    preparing a lower mother substrate, wherein a plurality of lower cells, each of which comprises a thin film transistor, is provided on the lower mother substrate, and a lower alignment layer is disposed on the plurality of lower cells;
    preparing an upper mother substrate, wherein a plurality of upper cells corresponding to the plurality of lower cells, respectively, are provided on the upper mother substrate, and an upper alignment layer is disposed on the plurality of upper cells;
    providing a mother substrate assembly by providing a liquid crystal mixture layer comprising liquid crystals between the lower mother substrate and the upper mother substrate and combining the lower mother substrate and the upper mother substrate;
    providing a pretilt of the liquid crystals by applying a voltage to voltage application units of the lower mother substrate, wherein the voltage application units of the lower mother substrate are exposed by the upper mother substrate; and
    curing an alignment supporting agent contained in at least one of the liquid crystal mixture layer and the lower and upper alignment layers by irradiating light to the mother substrate assembly from a side of the lower mother substrate.

2. The method of claim 1, wherein
each of the plurality of upper cells comprises a color filter.

3. The method of claim 2, wherein
the voltage application units are connected to a lower panel voltage application wiring and an upper panel voltage application wiring, which are disposed between adjacent lower cells and extending along a column of the plurality of lower cells.

4. The method of claim 3, further comprising:
    providing a lower panel voltage application pad, which is connected to a signal line of a lower cell of the plurality of lower cells, on the lower mother substrate.

5. The method of claim 4, further comprising:
    providing a lower panel connecting bridge and an upper panel connecting bridge on the upper mother substrate,
    wherein the lower panel connecting bridge overlaps the lower panel voltage application wiring and the lower panel voltage application pad, and
    wherein the upper panel connecting bridge overlaps the upper panel voltage application wiring and is connected to an opposing electrode disposed in an upper cell corresponding to the lower cell.

6. The method of claim 5, further comprising:
    providing a first short spacer, a second short spacer and a third short spacer between the lower mother substrate and the upper mother substrate,
    wherein the first short spacer is configured to electrically connect the lower panel voltage application pad and the lower panel connecting bridge,
    wherein the second short spacer is configured to electrically connect the lower panel voltage application wiring and the lower panel connecting bridge, and
    wherein the third short spacer is configured to electrically connect the upper panel voltage application wiring and the upper panel connecting bridge.

7. The method of claim 6, further comprising:
    providing a guard ring in a same layer as at least one of the lower panel voltage application wiring, the lower panel voltage application pad and the upper panel voltage application wiring,
    wherein the guard ring is disposed between the lower panel voltage application wiring and the upper panel voltage application wiring, and the lower panel voltage application pad.

8. The method of claim 2, wherein
the voltage application unit comprises a first lower panel voltage application wiring, a second lower panel voltage application wiring, and an upper panel voltage application wiring, and
the first lower panel voltage application wiring, the second lower panel voltage application wiring and the upper panel voltage application wiring are disposed between adjacent lower cells and extend along a column of the plurality of lower cells.

9. The method of claim 8, further comprising:
    providing a first lower panel voltage application pad and a second lower panel voltage application pad on the lower mother substrate,
    wherein the first lower panel voltage application pad is connected to a gate line which transmits a gate signal to a thin film transistor of a lower cell of the plurality of lower cells, and
    wherein the second lower panel voltage application pad is connected to a data line which transmits a data voltage to the thin film transistor of the lower cell.

10. The method of claim 9, further comprising:
    providing a first lower panel connecting bridge, a second lower panel connecting bridge and an upper panel connecting bridge on the upper mother substrate,
    wherein the first lower panel connecting bridge overlaps the first lower panel voltage application wiring and the first lower panel voltage application pad,
    wherein the second lower panel connecting bridge overlaps the second lower panel voltage application wiring and the second lower panel voltage application pad, and
    wherein the upper panel connecting bridge overlaps the upper panel voltage application wiring and is connected to an opposing electrode disposed in an upper cell corresponding to the lower cell.

11. The method of claim 10, further comprising:
    providing a first short spacer, a second short spacer, a third short spacer, a fourth short spacer and a fifth short spacer between the lower mother substrate and the upper mother substrate,
    wherein the first short spacer is configured to electrically connect the first lower panel voltage application pad and the first lower panel connecting bridge, wherein the second short spacer is configured to electrically connect the first lower panel voltage application wiring and the first lower panel connecting bridge, wherein the third short spacer is configured to electrically connect the second lower panel voltage application pad and the second lower panel connecting bridge, wherein the fourth short spacer is configured to electrically connect the second lower panel voltage application wiring and the second lower panel connecting bridge, and wherein the fifth short spacer is configured to electrically connect the upper panel voltage application wiring and the upper panel connecting bridge.

12. The method of claim 11, further comprising:
providing a guard ring in a same layer as at least one of the first and second lower panel voltage application wirings, the lower panel voltage application pad and the upper panel voltage application wiring,
wherein the guard ring is disposed between the upper panel voltage application wiring and the lower panel voltage application pad.

13. The method of claim 2, wherein
the voltage application unit comprises a lower panel voltage application electrode and an upper panel voltage application electrode, which are disposed adjacently to an edge of the lower mother substrate.

14. The method of claim 13, further comprising:
providing a lower panel voltage application pad on the lower mother substrate,
wherein the lower panel voltage application pad is connected to a signal line of a lower cell of the plurality of lower cells.

15. The method of claim 14, further comprising:
providing an opposing electrode and a voltage transmission electrode on the upper mother substrate,
wherein the opposing electrode is disposed in an upper cell corresponding to the lower cell and overlaps the upper panel voltage application electrode, and
wherein the voltage transmission electrode is insulated from the opposing electrode and overlaps the lower panel voltage application electrode.

16. The method of claim 15, further comprising:
providing a first short spacer, a second short spacer and a third short spacer between the lower mother substrate and the upper mother substrate,
wherein the first short spacer is configured to electrically connect the lower panel voltage application pad and the voltage transmission electrode,
wherein the second short spacer is configured to electrically connect the lower panel voltage application electrode and the voltage transmission electrode, and
wherein the third short spacer is configured to electrically connect the upper panel voltage application electrode and the opposing electrode.

17. The method of claim 1, wherein
the voltage application unit comprises a lower panel voltage application wiring and an upper panel voltage application wiring, which are disposed between adjacent lower cells and extending along a column of the plurality of lower cells.

18. The method of claim 17, further comprising:
providing a lower panel voltage application pad connected to a signal line of a lower cell of the plurality of lower cells on the lower mother substrate.

19. The method of claim 1, wherein
the voltage application unit comprises a first lower panel voltage application wiring, a second lower panel voltage application wiring, and an upper panel voltage application wiring, and
the first lower panel voltage application wiring, the second lower panel voltage application wiring and the upper panel voltage application wiring are disposed between adjacent lower cells and extend along a column of the plurality of lower cells.

20. The method of claim 1, wherein
the voltage application unit comprises a lower panel voltage application electrode and an upper panel voltage application electrode, which are disposed adjacent to an edge of the lower mother substrate.

* * * * *